March 30, 1954  H. A. SKOG  2,673,583
FRUIT SPLITTING, SPREADING, AND PITTING APPARATUS
Filed June 4, 1948  21 Sheets-Sheet 1

INVENTOR.
Henry A. Skog
BY
Moore, Olson & Trexler
attys.

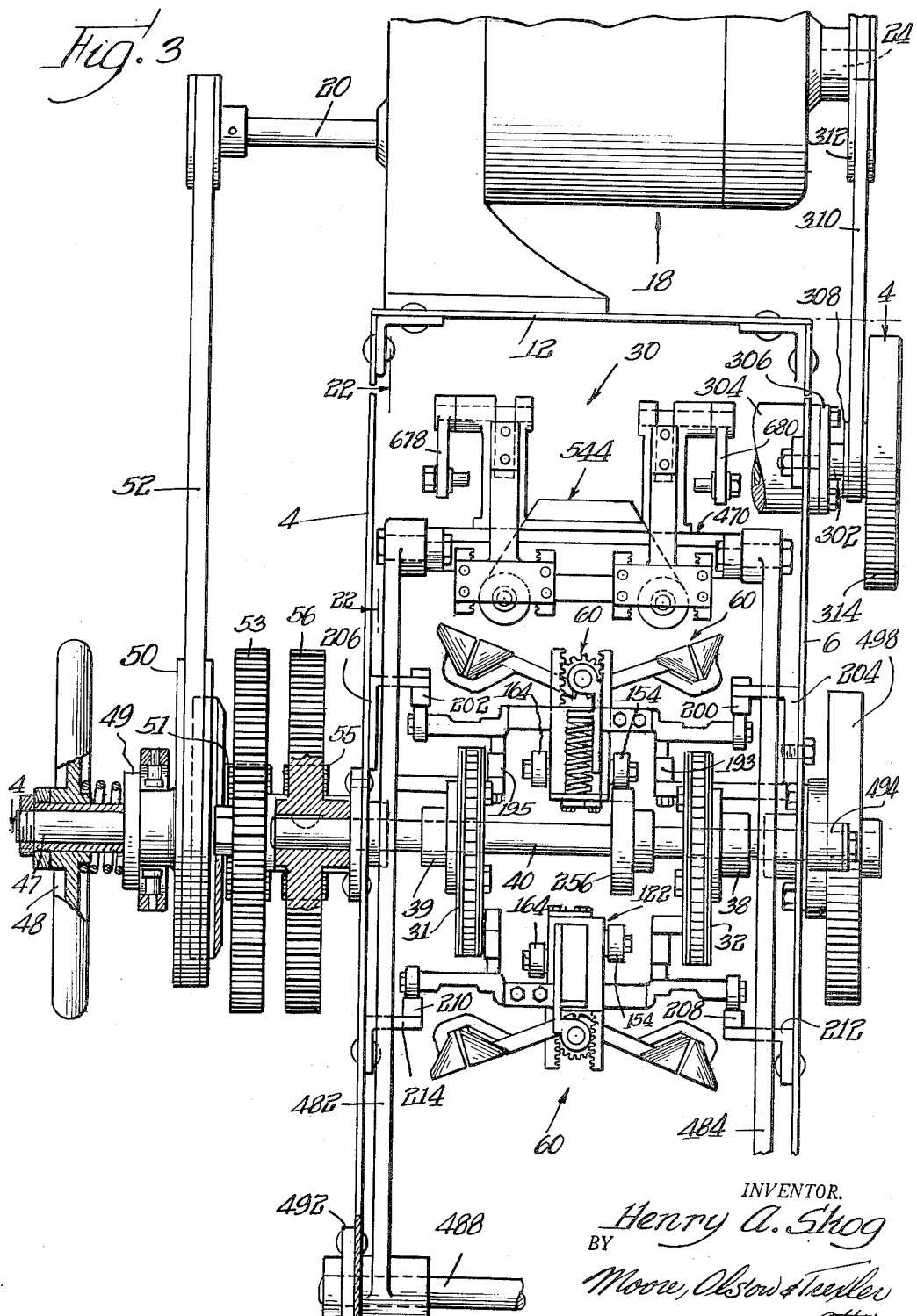

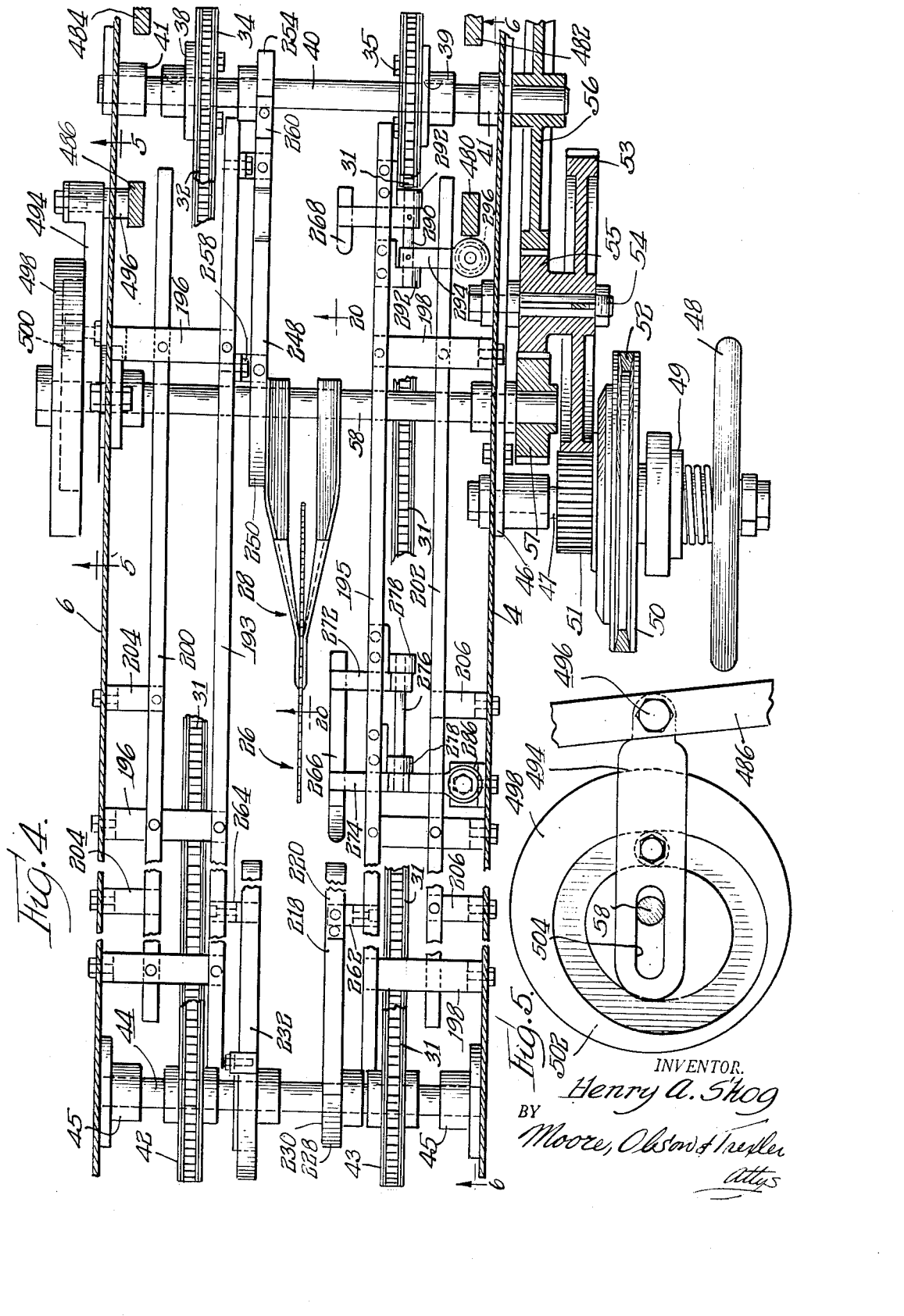

March 30, 1954 H. A. SKOG 2,673,583
FRUIT SPLITTING, SPREADING, AND PITTING APPARATUS
Filed June 4, 1948 21 Sheets-Sheet 4
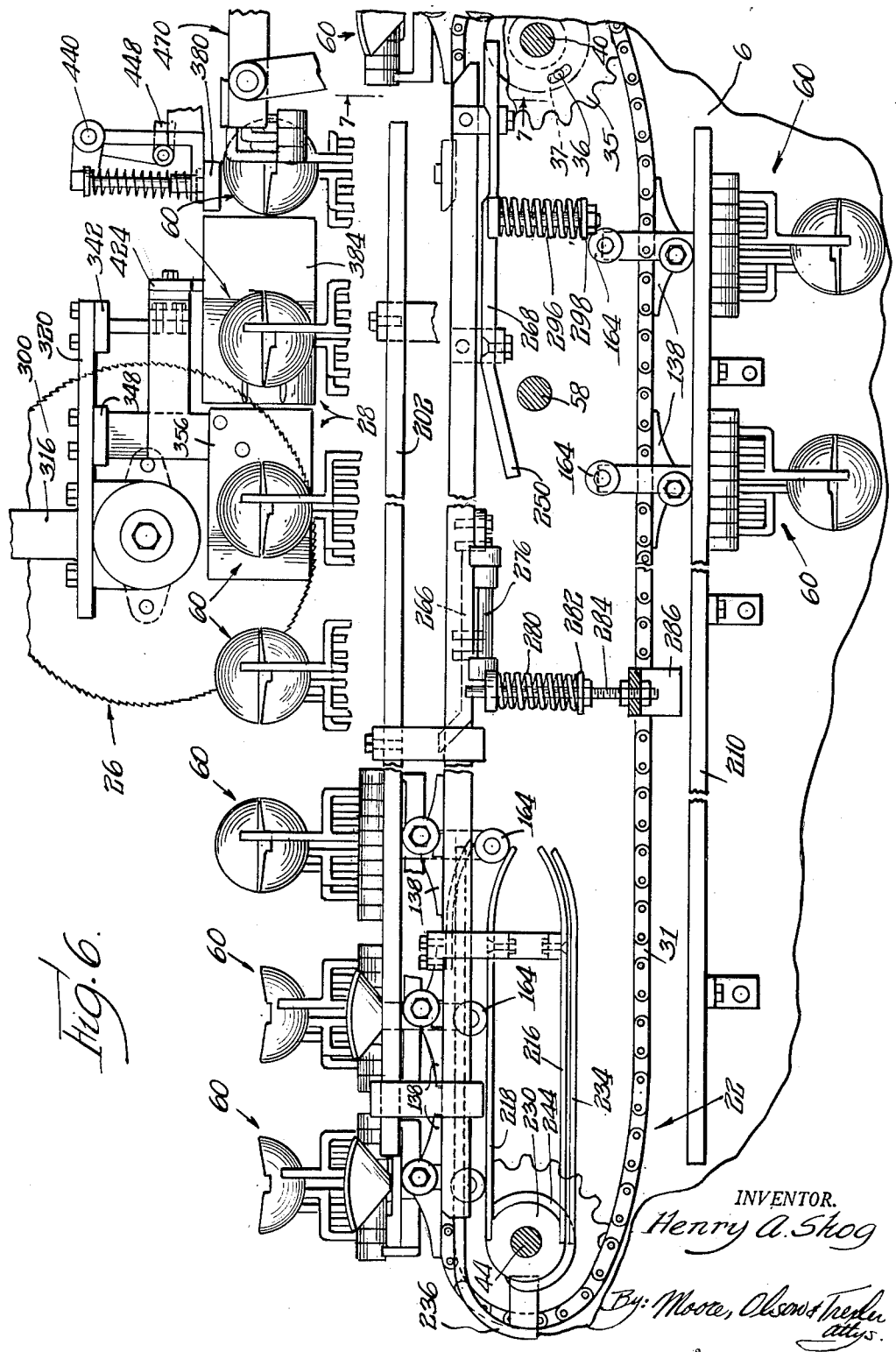
INVENTOR.
Henry A. Skog
By: Moore, Olson & Trexler
attys.

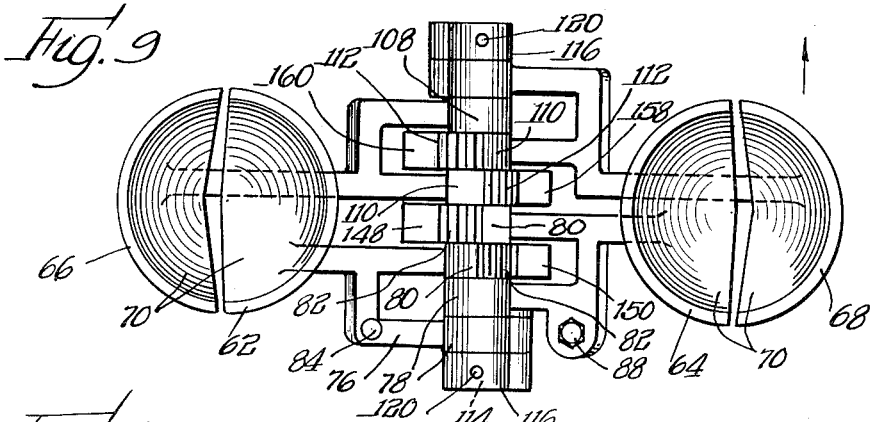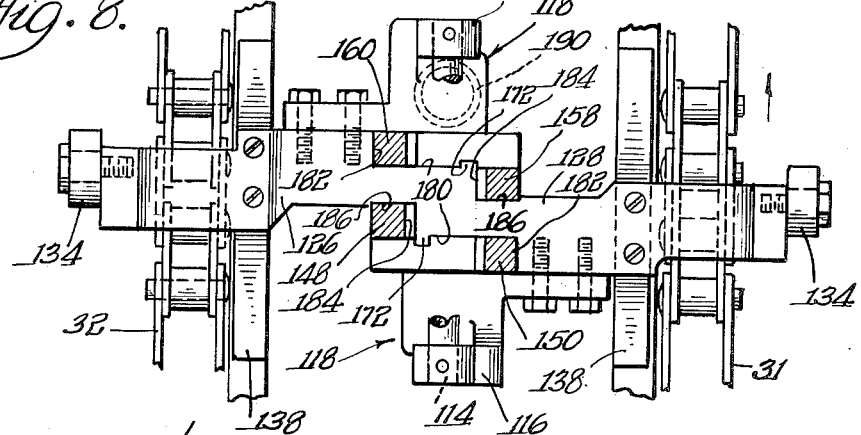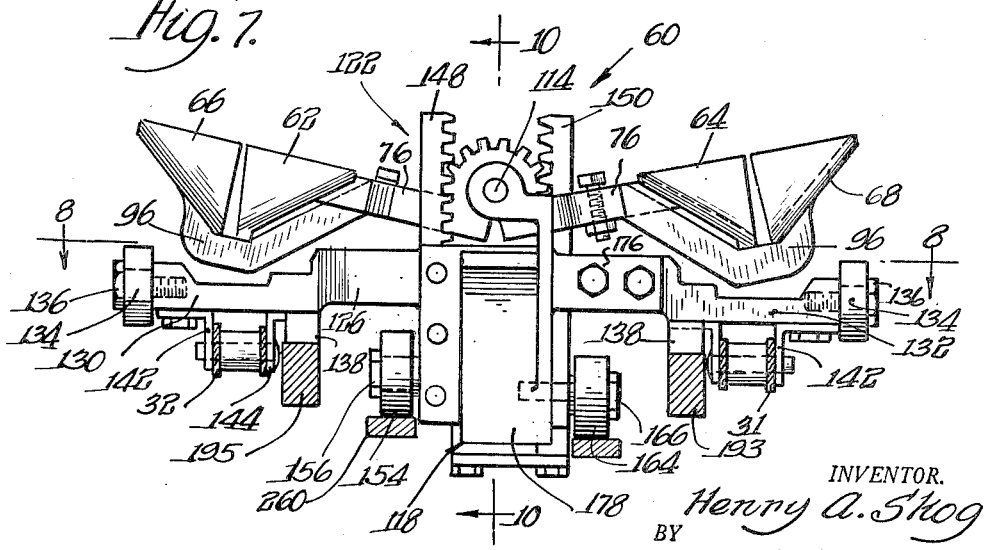

March 30, 1954 H. A. SKOG 2,673,583
FRUIT SPLITTING, SPREADING, AND PITTING APPARATUS
Filed June 4, 1948
21 Sheets-Sheet 6
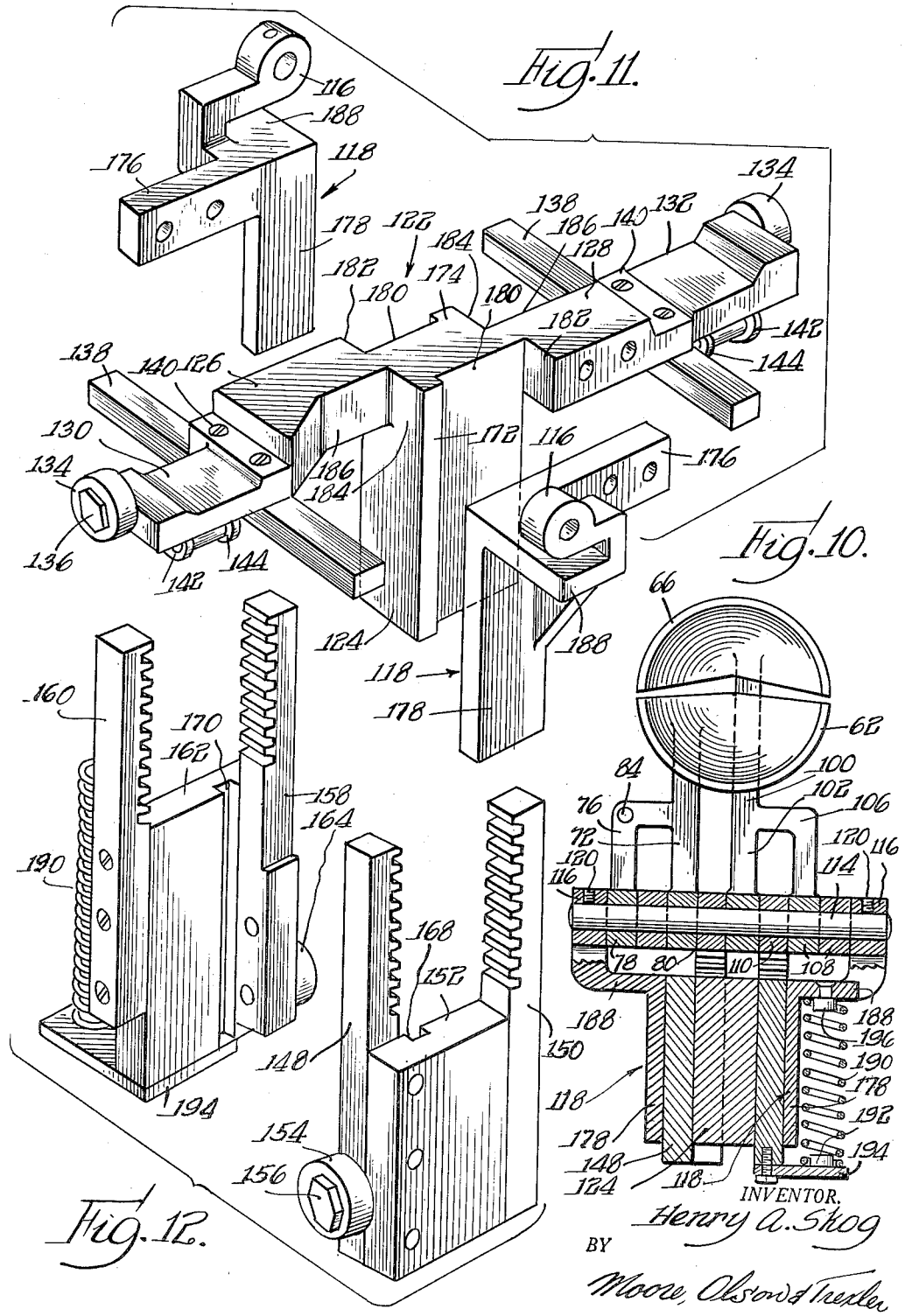
INVENTOR.
Henry A. Skog
BY
Moore, Olson & Trexler
attys.

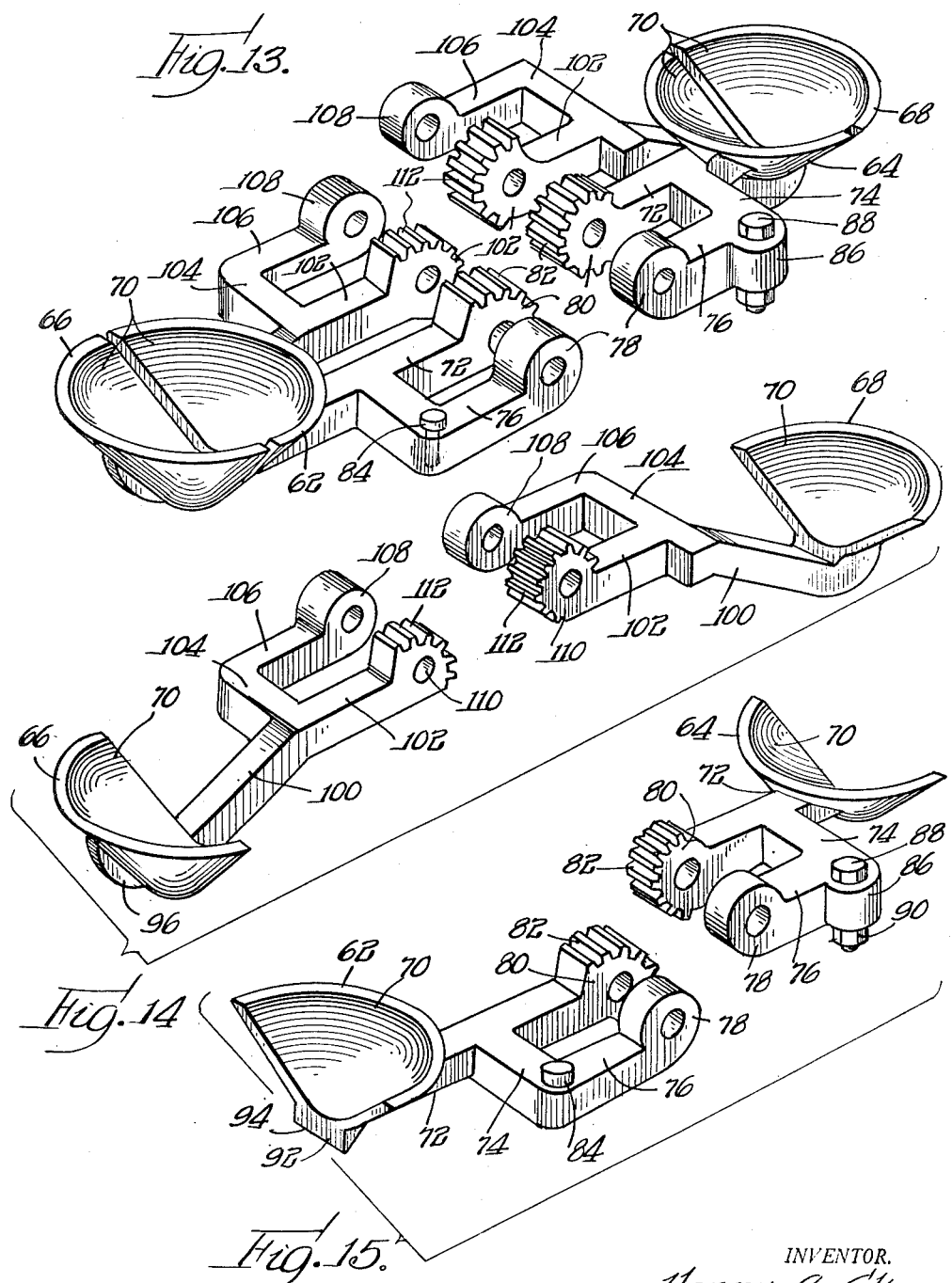

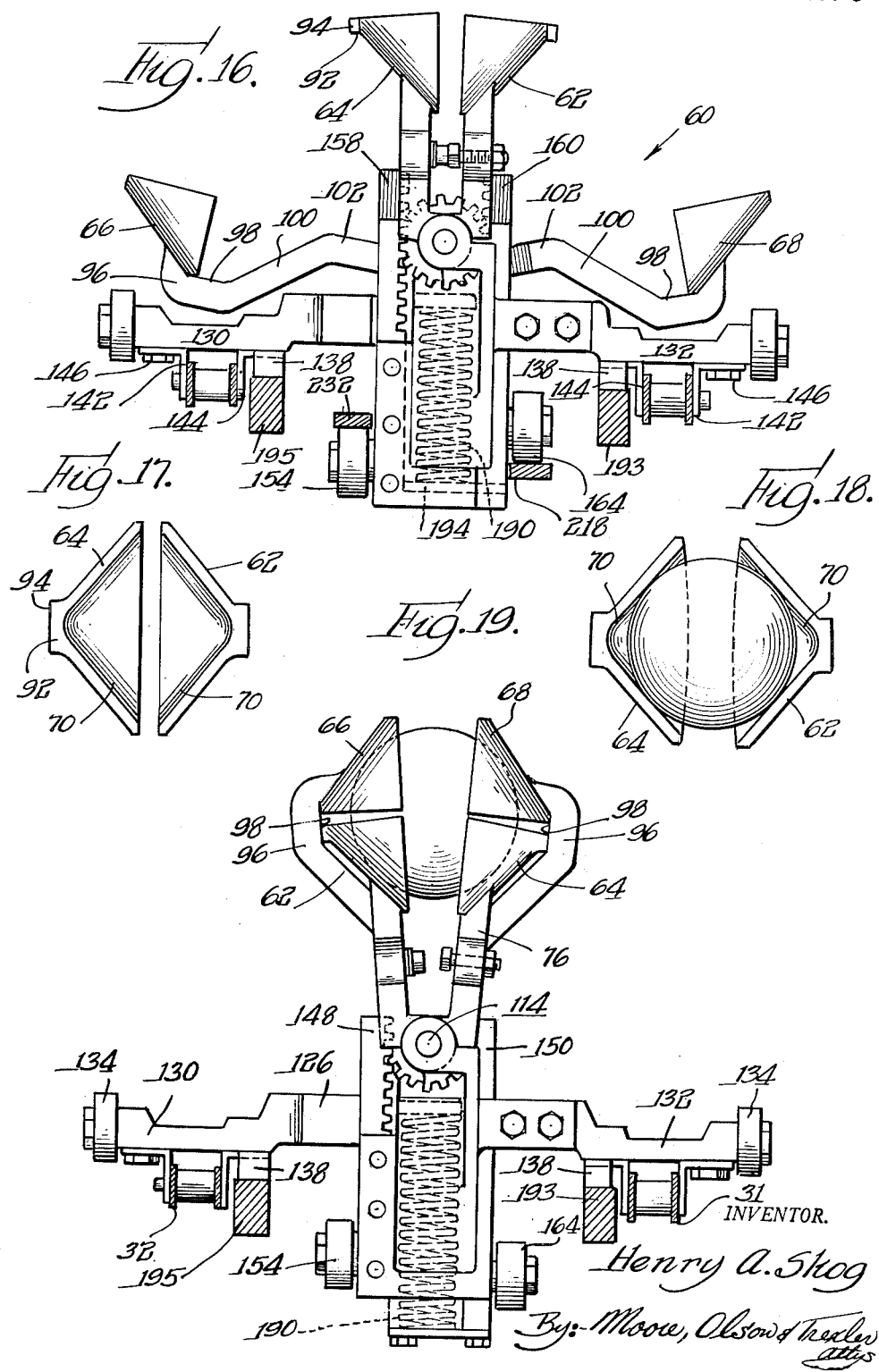

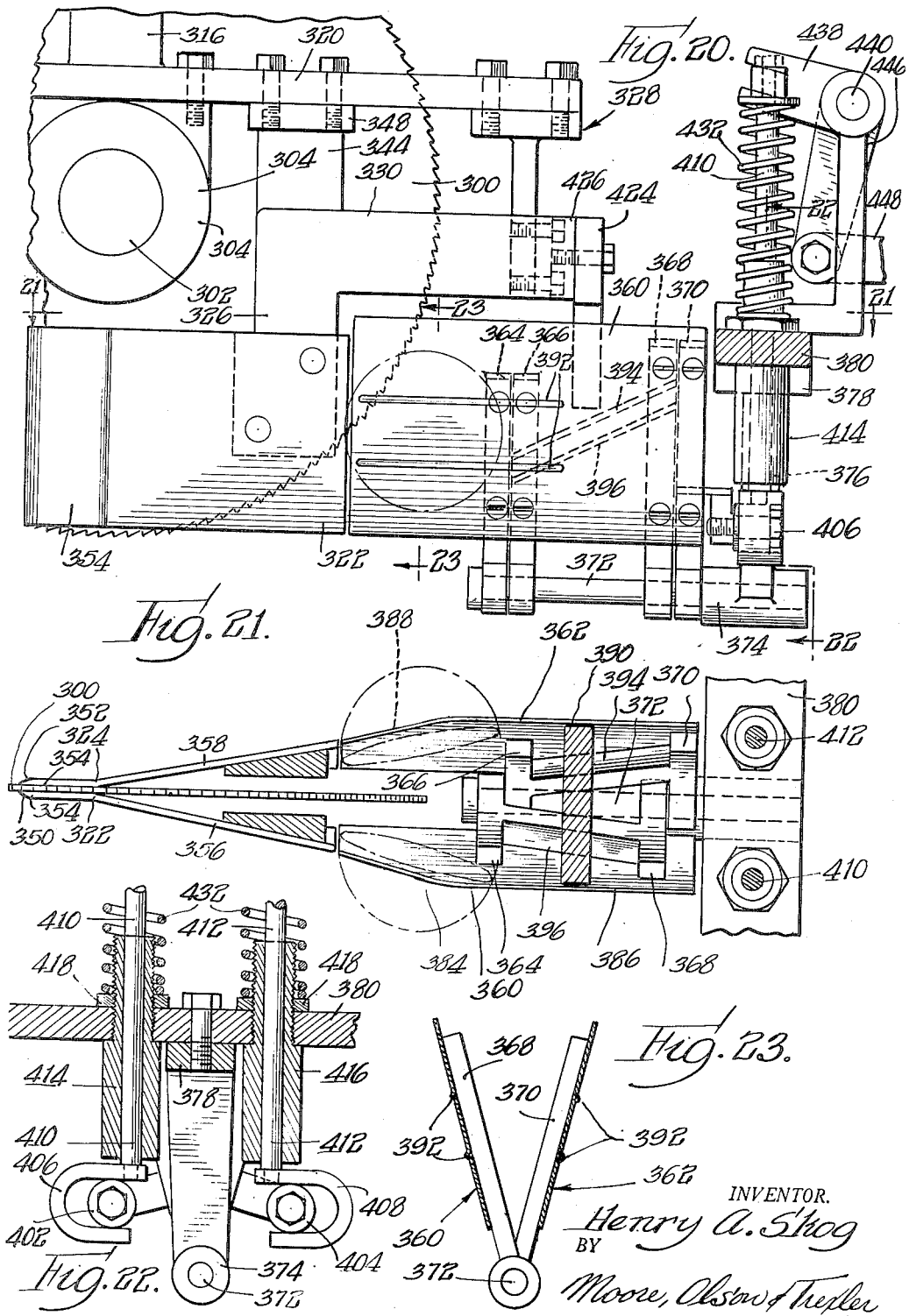

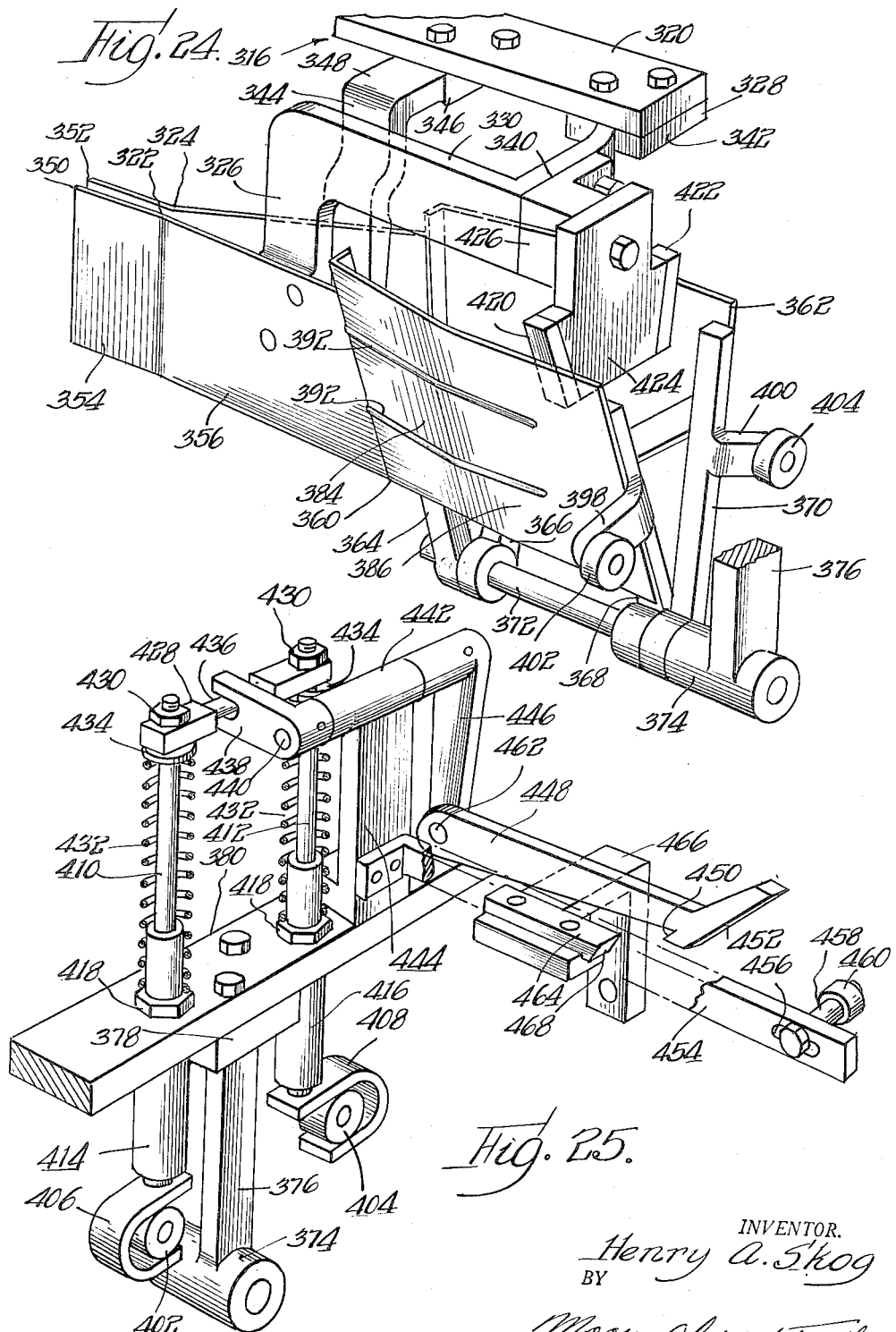

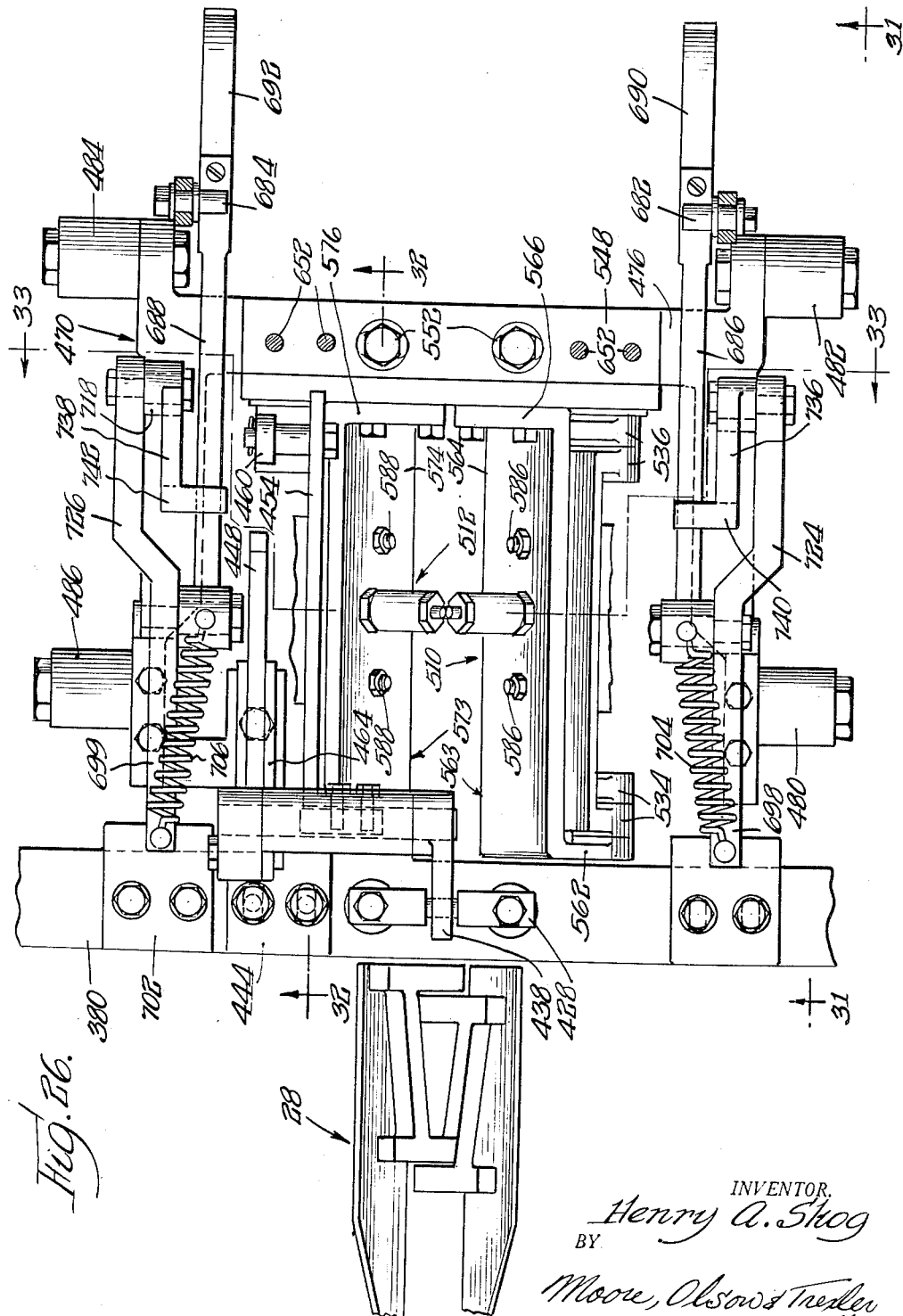

March 30, 1954

H. A. SKOG 2,673,583

FRUIT SPLITTING, SPREADING, AND PITTING APPARATUS

Filed June 4, 1948

INVENTOR.
Henry A. Skog
BY
Moore, Olson & Trexler
Attys.

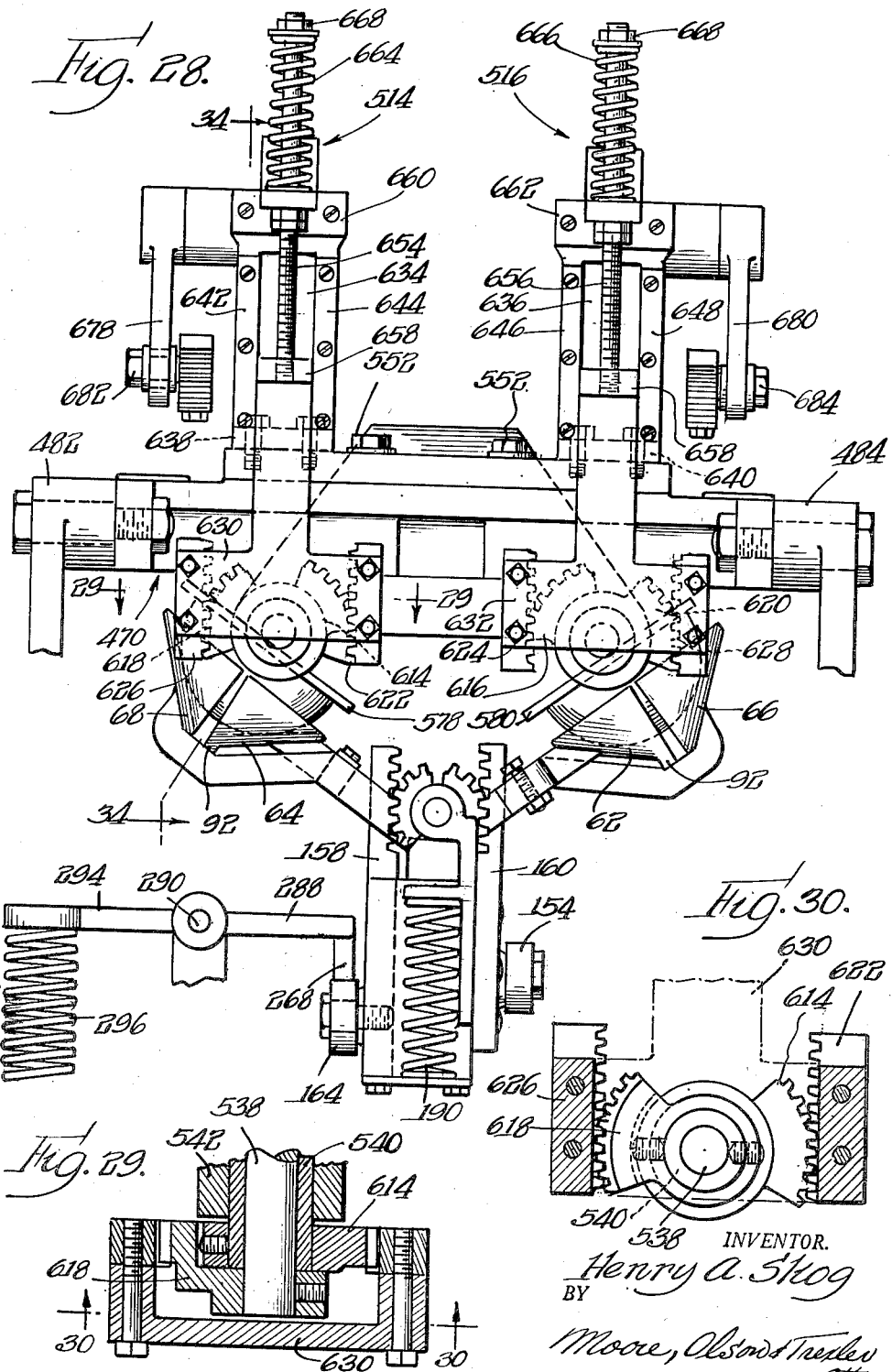

March 30, 1954 H. A. SKOG 2,673,583
FRUIT SPLITTING, SPREADING, AND PITTING APPARATUS
Filed June 4, 1948 21 Sheets-Sheet 14
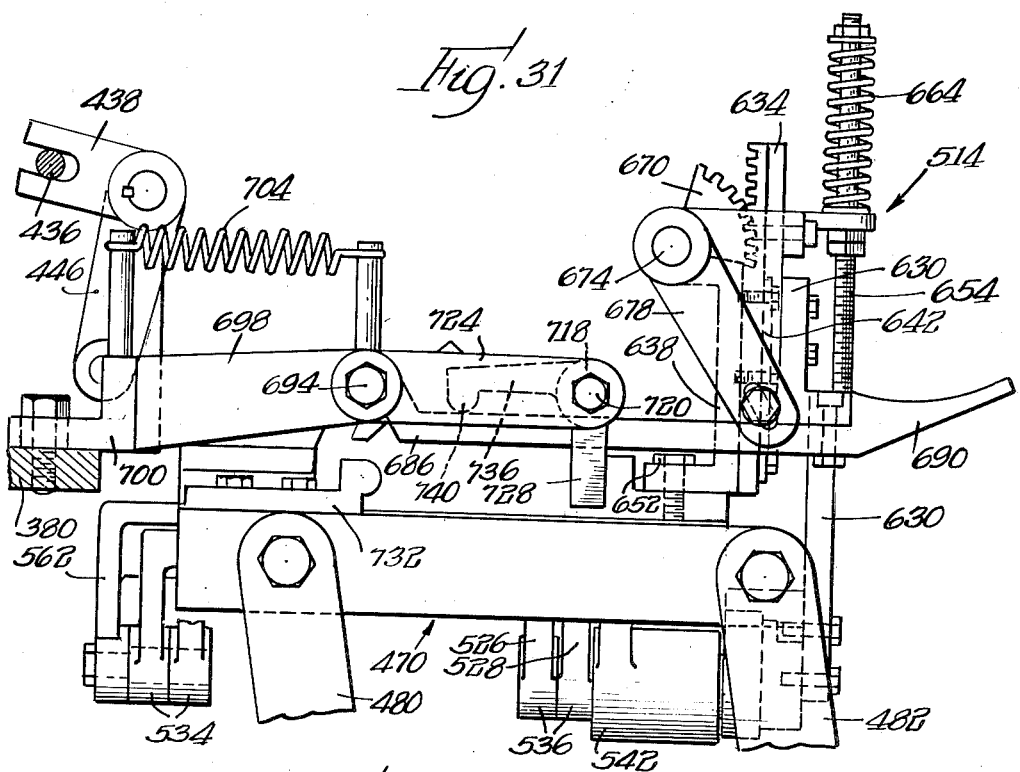
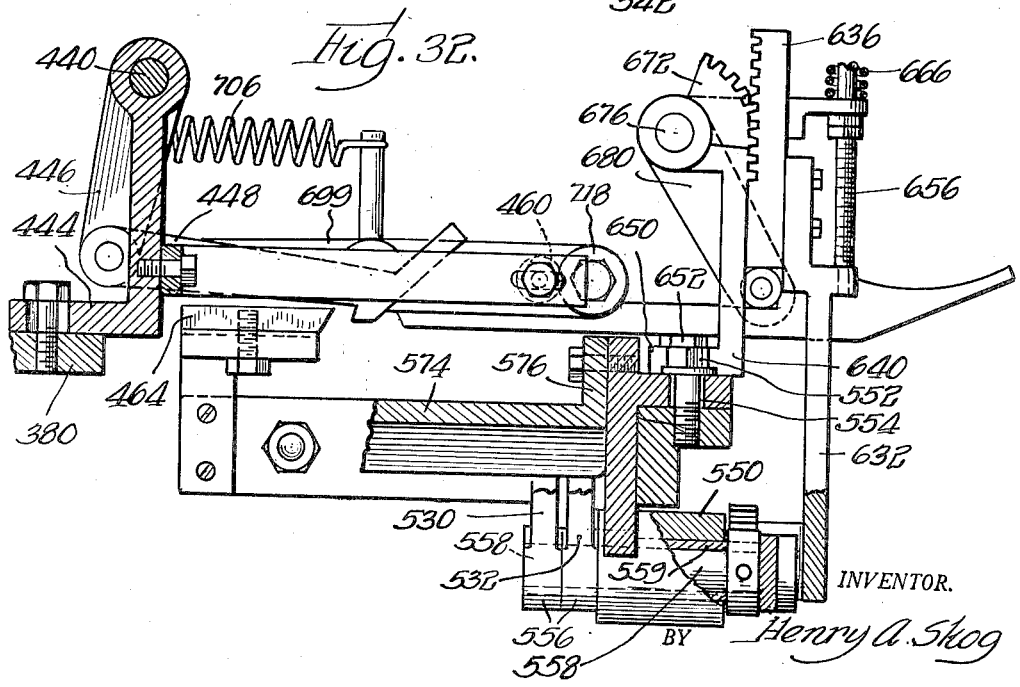
INVENTOR.
Henry A. Skog
BY Moore, Olson & Trewilu attys.

March 30, 1954     H. A. SKOG     2,673,583
FRUIT SPLITTING, SPREADING, AND PITTING APPARATUS
Filed June 4, 1948     21 Sheets-Sheet 15

INVENTOR.
Henry A. Skog
BY
Moore, Olson & Trexler
attys.

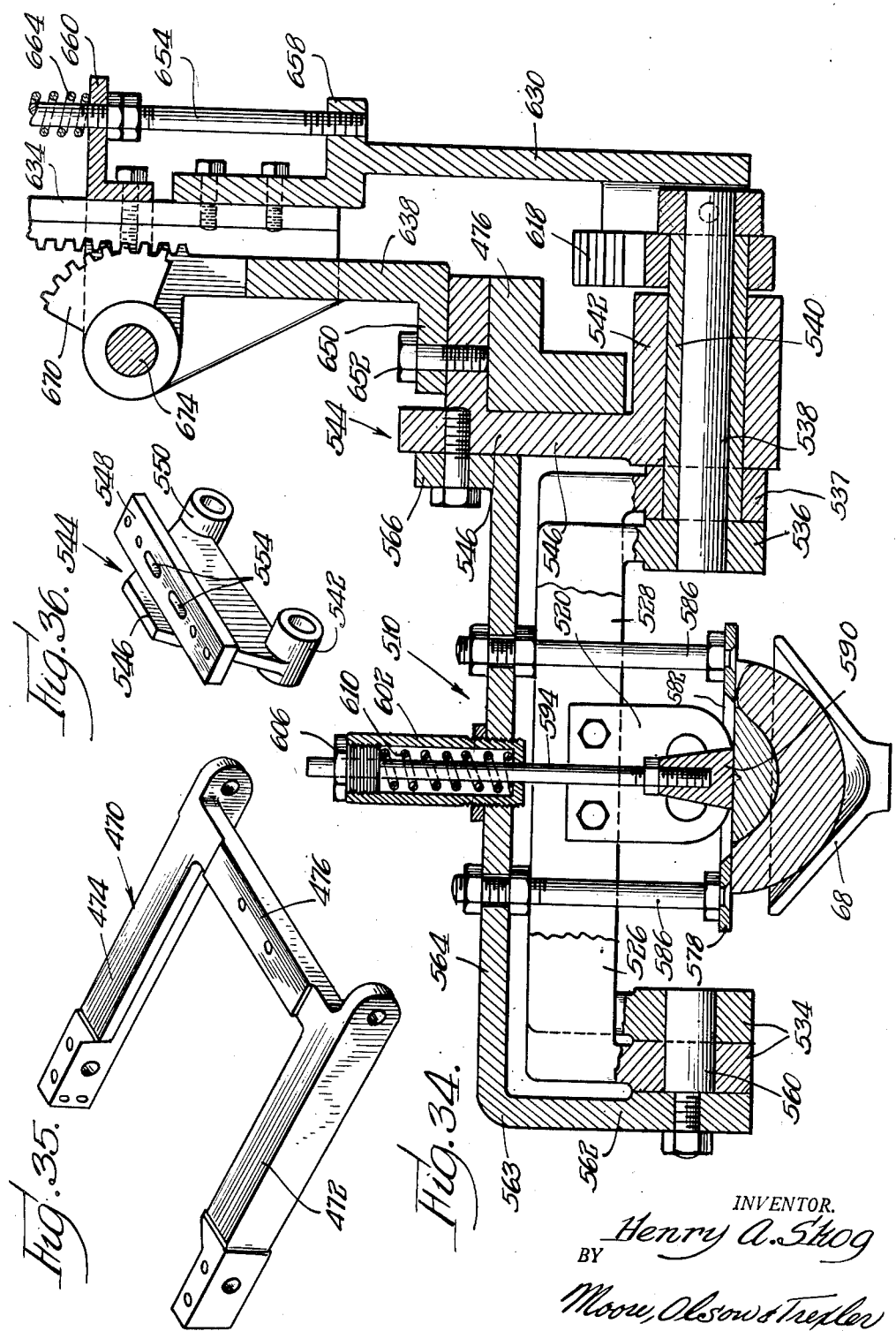

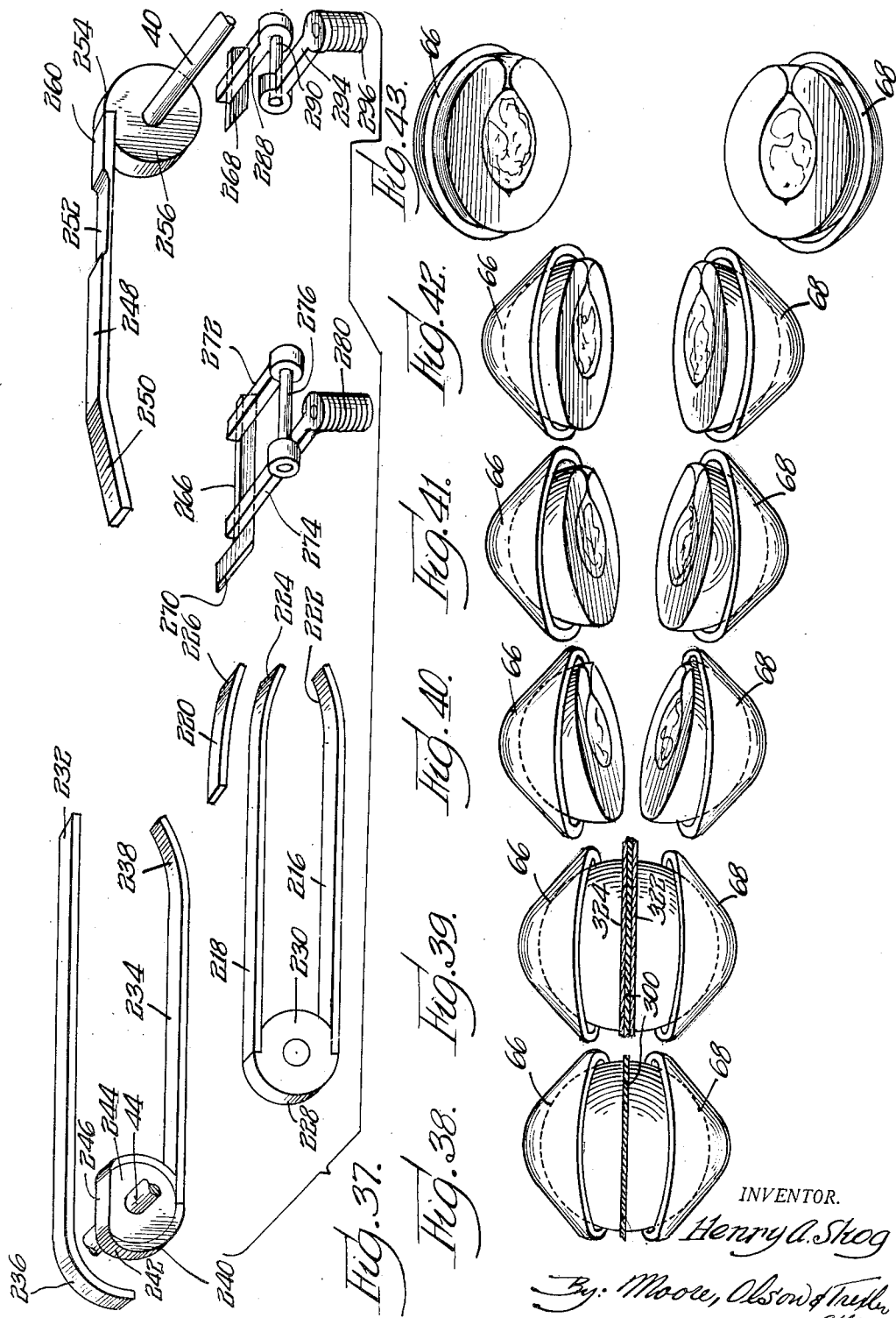

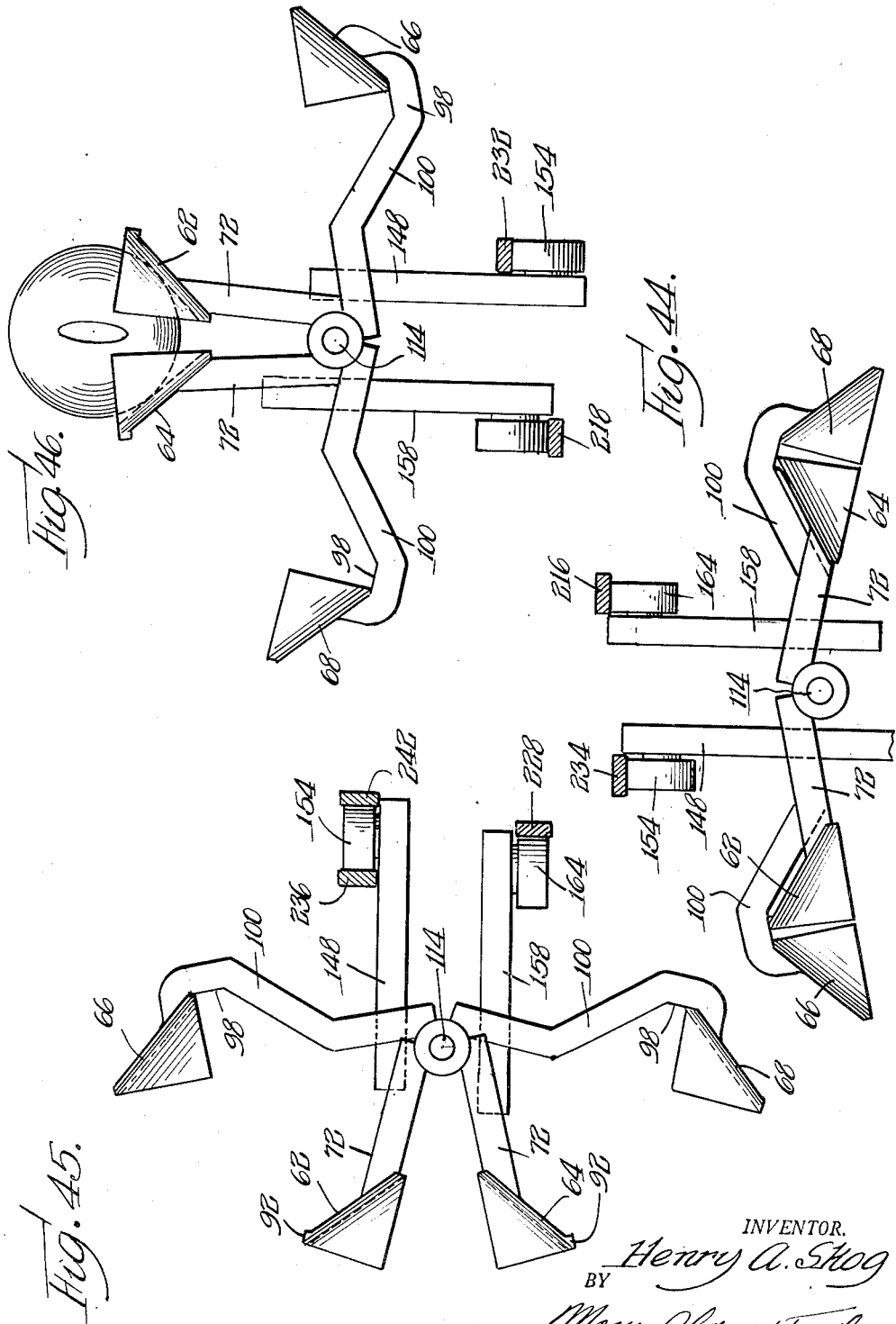

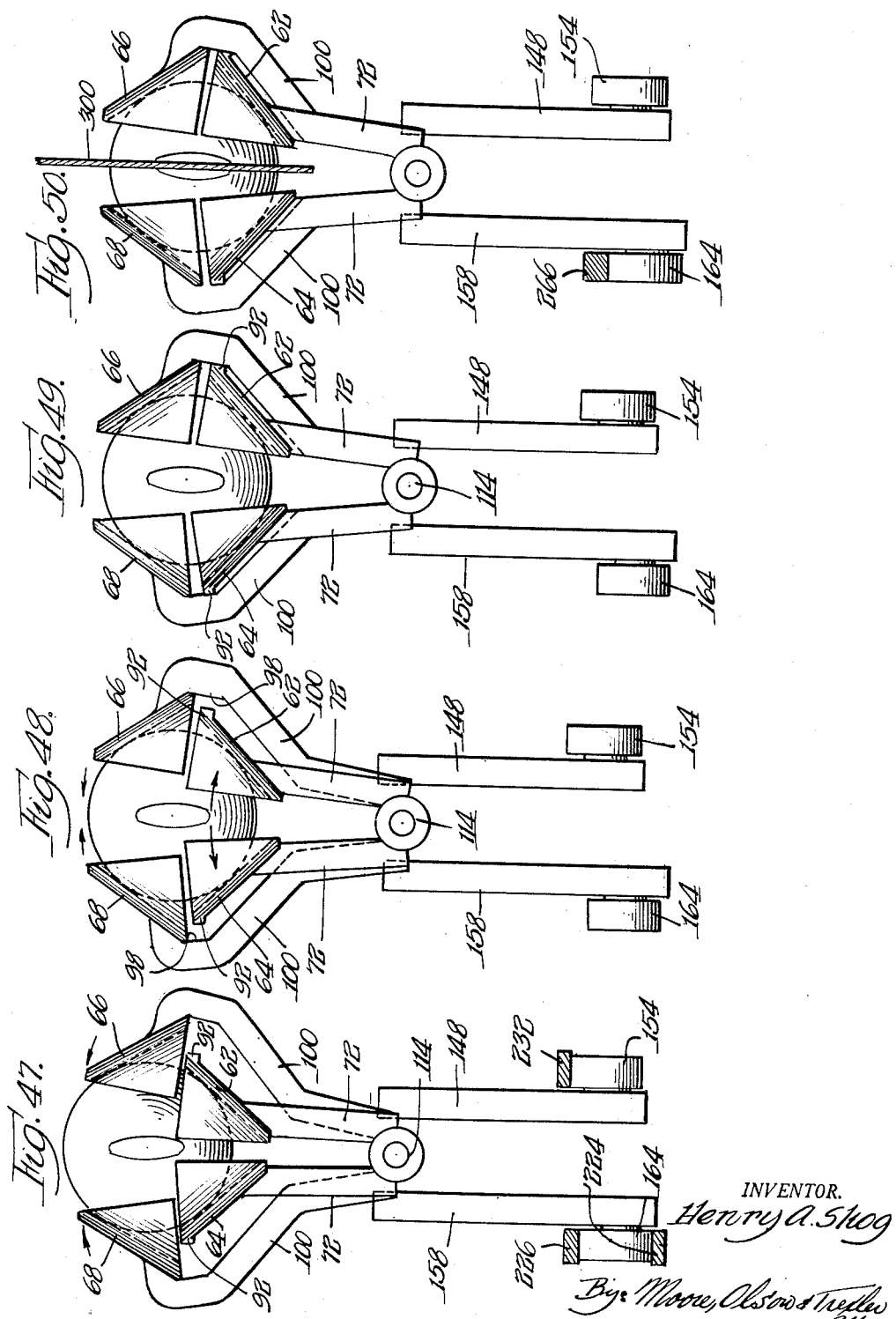

March 30, 1954  H. A. SKOG  2,673,583
FRUIT SPLITTING, SPREADING, AND PITTING APPARATUS
Filed June 4, 1948  21 Sheets-Sheet 20
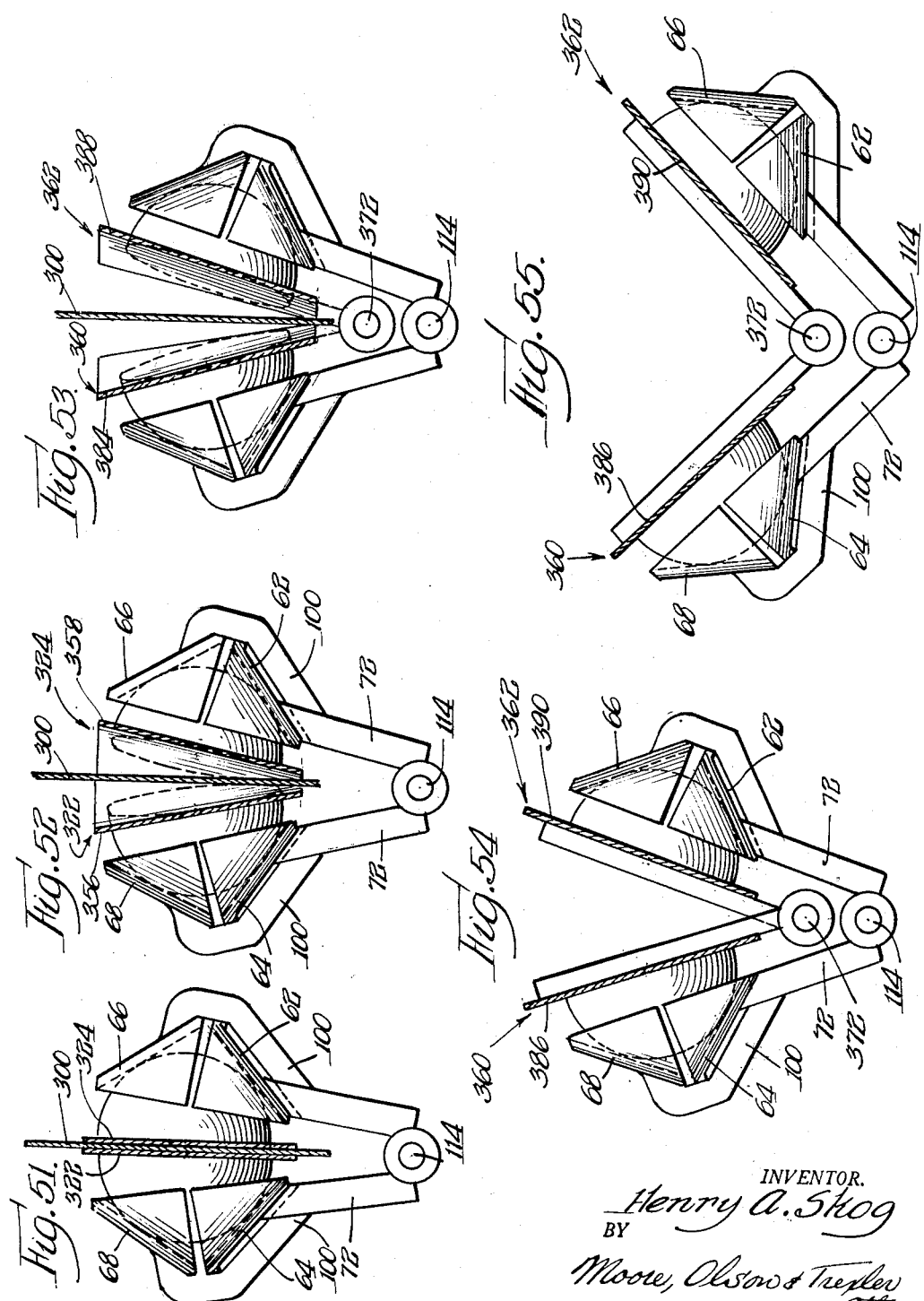
INVENTOR.
Henry A. Skog
BY
Moore, Olson & Trexler
attys.

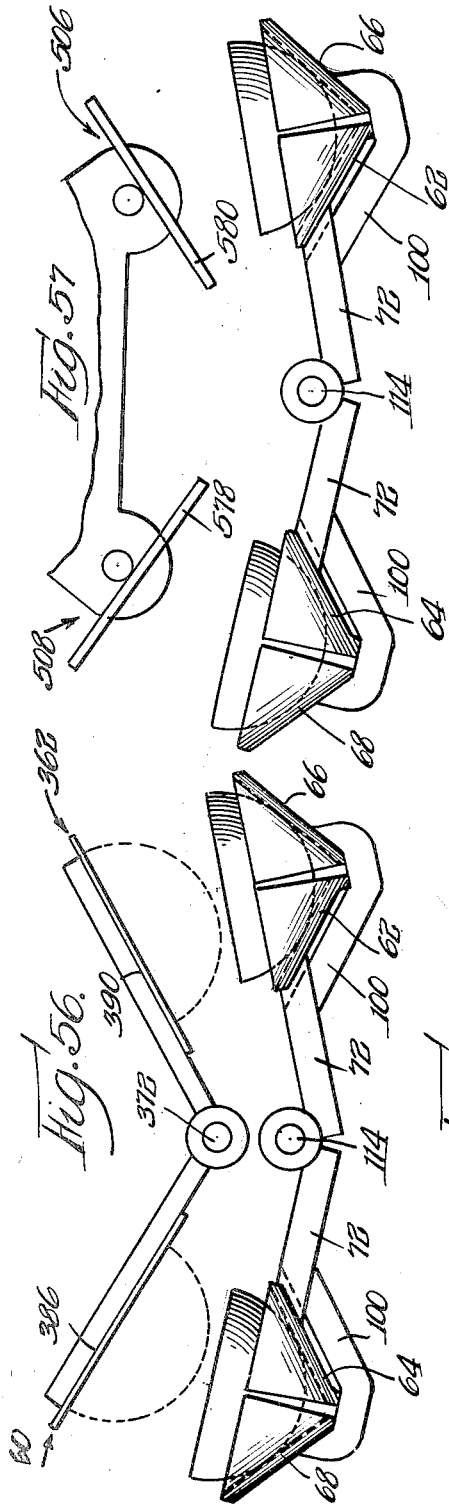

Patented Mar. 30, 1954

2,673,583

UNITED STATES PATENT OFFICE 2,673,583

FRUIT SPLITTING, SPREADING, AND PITTING APPARATUS

Henry A. Skog, Olympia, Wash., assignor to Special Equipment Company, Portland, Oreg., a corporation of Oregon Application June 4, 1948, Serial No. 31,054

21 Claims. (Cl. 146—28)

This invention relates to fruit treating apparatus, and more particularly to a machine adapted to receive a whole fruit and automatically and continuously process fruit at a high rate for canning purposes.

Among the objects of the present invention is to provide a machine which is continuous in operation, as distinguished from an intermittent machine, to handle and process fruit, particularly clingstone peaches, at a high rate; to provide a machine which is adapted to receive whole fruit, centralize the fruit with respect to a predetermined plane, split the fruit along said plane as it is being continuously fed, separate or spread the split halves as they are continuously fed beyond the splitting zone, raise the split halves simultaneously into engagement with a traveling pitter mechanism which pits both halves as they are continuously fed through the machine and finally discharge the pitted halves; to provide, in a continuous fruit treating machine, conveyor means which receives whole fruit, carries the whole fruit first past splitter means, then past spreader devices and thereafter carries the split halves laterally into engagement with multiple, traveling pitter or deseeding mechanisms and then forwardly in synchronism with said mechanisms while said mechanisms operate on the fruit halves simultaneously to pit or core the halves without interrupting the forward movement of the conveyor means; to provide in a fruit treating machine holders, cups or clamps to receive whole fruit, to center the fruit for, and hold it in position during, splitting along one plane and thereafter hold the split halves of the fruit with their exposed faces in planes transverse to the plane of splitting for simultaneous pitting or coring; to provide a new, novel and improved splitting and spreading mechanism for dividing whole fruit and spreading the split halves while the fruit is continuously fed, all without injury to or marring of the exposed surfaces of the fruit halves; to provide a pitting or coring mechanism for simultaneously removing the seed containing sections of two halves of a fruit while the fruit is continuously moved or fed along a predetermined path at a relatively high rate of speed; to provide a device for simultaneously pitting two half peaches wherein the pitting is accomplished by mechanism carried by a pitting head which moves back and forth in synchronous speed relation to a continuously moving conveyor carrying the half peaches, the pitting mechanism on the head being automatically operated by the forward movement of the head and thus possibility of the operation of the pitting mechanism getting out of proper timed relation with the movement of the pitting head is absolutely precluded; to provide in a continuously operating machine for splitting whole peaches and thereafter pitting the halves, means for spreading the halves after splitting to present the split halves with their cut faces exposed to a traveling pitter mechanism movable back and forth in proper timed relation to the continuous conveyor by which the fruit is fed, the back and forth movement of the pitting head serving to operate both the spreading mechanism and the pitting mechanism thereby simplifying the drive mechanism and assuring the maintenance of the proper timed relations between the several operated mechanisms; to provide a traveling pitting mechanism capable of pitting two peach halves simultaneously as the halves are fed continuously without interruption or change in speed past a pitter zone; to provide a continuous fruit feeder for a traveling pitter mechanism capable of simultaneously pitting two peach halves, which feeder moves the peach halves laterally of their path of feed into engagement with the traveling pitter head so that the necessity for raising and lowering the relatively heavy pitter head and mechanism carried thereby is avoided; to provide a pitting device wherein a pitting head, which carries a pitting mechanism capable of simultaneously pitting two peach halves, is adapted to swing back and forth on pivotally mounted arms synchronized in the speed of their swinging movement with a continuous fruit feeder which embodies fruit holding mechanism movable toward and away from the swinging pitter head whereby to permit the pitting of both fruit halves simultaneously without stopping the feeding of the fruit; to provide in a fruit treating machine fruit holding cups so constructed and so operated as to hold whole fruit for splitting and other treatment and also hold the fruit halves, after splitting, for subsequent treatments, thereby eliminating the need of multiple, separate conveyors and holders for whole and half fruit and transfer mechanism for carrying the fruit from one to the other; to provide a fruit holder having four sections or quadrants relatively movable first to form an open top cup, with its mouth facing upwardly, for receiving a whole fruit, then to form horizontally spaced vertical clamps centralizing the fruit on a predetermined vertical plane and carrying it in such clamped position past a splitter device, and finally, to form half fruit holders supporting both fruit halves with their cut faces uppermost for presentation to a seeding or pitting mechanism which operates upon the halves from the exposed faces thereof simultaneously to seed or pit both halves; to provide, in such a fruit holder, means for moving the cup sections or quadrants to or into their different positions or forms automatically as they move continuously along a predetermined endless path; and to provide in a fruit treating machine a continuously operating fruit conveyor comprising endless chains and a plurality of fruit holders secured to said chains in spaced relation for continuous movement with the chains but so mounted and operated as to be relatively movable automatically toward and from each other to vertical, horizontal and other positions relative to the chains without interrupting the movement of the chains.

These and other objects and advantages of the invention will be apparent from the following description when taken in connection with the accompanying drawings wherein:

Fig. 1 is a view in side elevation of a machine embodying the present invention;

Fig. 2 is a fragmentary view in side elevation and partly in section with the pitter mechanism of the machine shown in Fig. 1 in a different position of operation;

Fig. 3 is an enlarged, fragmentary view in end elevation and partly in section taken along the line 3—3 of Fig. 1;

Fig. 4 is an enlarged fragmentary plan view and partly in section taken along the line 4—4 of Fig. 1;

Fig. 5 is a fragmentary view in vertical section taken substantially along the line 5—5 of Fig. 4;

Fig. 6 is a fragmentary view in vertical section taken substantially along the line 6—6 of Fig. 4;

Fig. 7 is an enlarged fragmentary view in vertical section taken along the line 7—7 of Fig. 6;

Fig. 8 is a fragmentary view in horizontal section taken along the line 8—8 of Fig. 7;

Fig. 9 is a fragmentary plan view of the mechanism shown in Fig. 7;

Fig. 10 is a fragmentary view in vertical section taken along the line 10—10 of Fig. 7;

Fig. 11 is an exploded perspective view of the traveling carriage for the fruit holders or cups;

Fig. 12 is an exploded view in perspective of cup actuating racks;

Fig. 13 is an exploded view in perspective of the four sections forming a fruit cup or holder;

Fig. 14 is an exploded view in perspective of the outer cup sections;

Fig. 15 is an exploded view in perspective of the inner cup sections;

Fig. 16 is a view similar to Fig. 7 but showing the inner cup sections in raised position to receive the whole fruit from the operator;

Fig. 17 is a plan view showing the inner cup sections in raised position to receive a whole fruit;

Fig. 18 is a view similar to Fig. 17, but showing the positioning of the inner cup sections when the whole peach has been centralized;

Fig. 19 is a view similar to Fig. 16 showing the outer cup sections raised to fruit clamping and centralizing position;

Fig. 20 is an enlarged fragmentary view in vertical section taken along the line 20—20 of Fig. 4;

Fig. 21 is a fragmentary view in horizontal section taken substantially along the line 21—21 of Fig. 20;

Fig. 22 is a fragmentary view in vertical section taken substantially along the line 22—22 of Fig. 20;

Fig. 23 is a view in vertical section taken along the line 23—23 of Fig. 20;

Fig. 24 is a view in perspective of the fruit separating and spreading mechanism;

Fig. 25 is a view in perspective and partly in section of the operating mechanism for the spreader blades of the fruit separating and spreading mechanism;

Fig. 26 is an enlarged view in horizontal section taken along the line 26—26 of Fig. 1 and shows the pitter mechanism in plan view;

Fig. 28 is an enlarged view in end elevation of the pitter mechanism and is taken substantially on the line 28—28 of Fig. 1;

Fig. 29 is an enlarged fragmentary view in horizontal section taken along the line 29—29 of Fig. 28;

Fig. 30 is a fragmentary view in vertical section taken along the line 30—30 of Fig. 29;

Fig. 31 is a view in side elevation of the pitter mechanism as taken substantially along the line 31—31 of Fig. 26;

Fig. 32 is a view in vertical section taken substantially along the line 32—32 of Fig. 26;

Fig. 34 is an enlarged view in vertical section taken substantially along the line 34—34 of Fig. 28;

Fig. 35 is a view in perspective of the pitter head frame casting;

Fig. 36 is a view in perspective of a pitter mechanism mounting bracket;

Fig. 37 is a diagrammatic view in perspective showing cam tracks controlling the positioning of the fruit holder cups as they travel around with the upper and lower flights of the conveyor;

Figs. 38 to 43 are diagrammatic plan views sequentially illustrating the splitting and spreading of the fruit;

Figs. 44 to 49 are diagrammatic views in elevation illustrating sequentially the movements of the cups or holders to whole fruit receiving and whole fruit centralizing positions;

Figs. 50 to 55 are diagrammatic views in elevation corresponding to the diagrammatic plan views of Figs. 38 to 43 and illustrating sequentially the positioning of the cups or holders as the fruit is split and spread;

Figure 27:
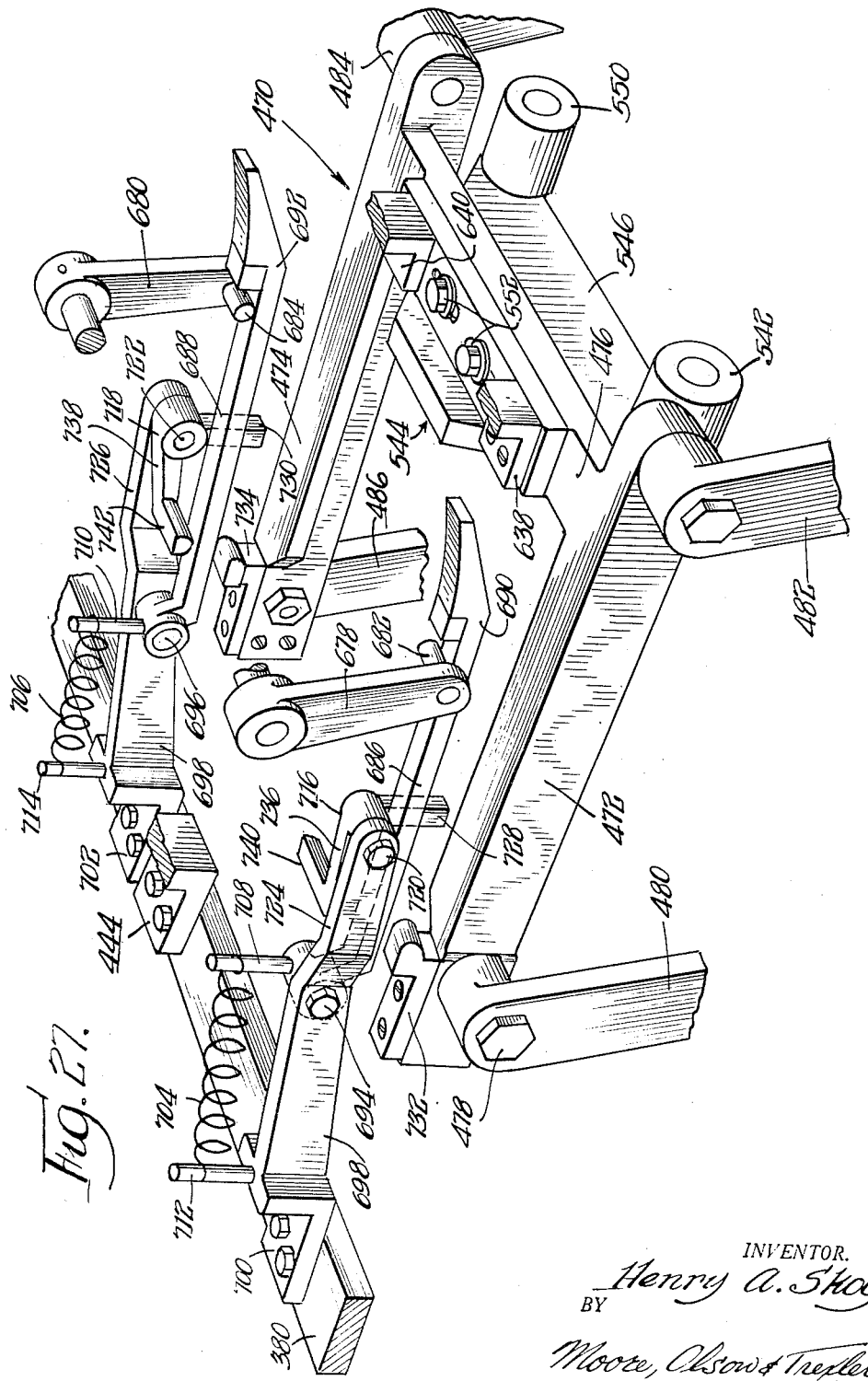
Fig. 27 is a view in perspective showing the pitter head frame and certain operating mechanism.

Fig. 56 is a diagrammatic view in elevation illustrating the discharge of the fruit halves from the spreading mechanism; and Figs. 57 to 59 are diagrammatic views in elevation illustrating sequentially the positioning of the cups to present the fruit halves to simultaneous pitting mechanism, hold the fruit halves in cooperative relation with the pitting mechanism, and withdraw the pitted fruit halves from the pitting mechanism.

The present invention is best exemplified by reference to an automatic machine adapted to receive a succession of whole fruit, such for instance as whole peaches, and particularly peaches of the clingstone variety, and continuously pass each of the succession of whole fruits through the machine, in the course of which continuous passage the whole fruit is divided, the divided halves separated, brought simultaneously under a traveling pitter or deseeder which extracts the pit from the fruit without interrupting its passage through the machine, and the pitted or deseeded halves are then discharged from the machine as each fruit holder begins its reverse travel to receive the next whole fruit.

It will be apparent that the present invention has a plurality of aspects, first in respect to the complete automatic machine in which the invention resides in the arrangement of the various operating mechanisms successively to process whole fruit as it is continuously passed, without interruption of its motion, through the machine, including mechanism for splitting the whole fruit, subsequently pitting or coring it, and then discharging the pitted or cored halves from the machine, and in addition the entire invention includes various ancillary inventions in the various and sundry mechanisms which enter into the complete machine, such for instance as the feeding mechanism for receiving whole fruit and clamping the whole fruit while carrying them past a dividing mechanism; the dividing mechanism itself, the mechanism which causes the feeding mechanism to feed with equal facility the half fruits after they have been split, as the whole fruits before splitting; the spreading mechanism by which the split fruit is separated and spread into spaced halves for presentation to the pitter or corer mechanism; the pitter mechanism itself, which simultaneously pits two fruit halves while they are being continuously passed through the machine and without interrupting the movements of the fruit through the machine, and which pitter mechanism is exceedingly simple in nature, rugged in character, and efficient in operation at a high fruit processing rate, and the structure of the fruit holding cups and their control mechanisms.

It is to be understood that while the present invention in some of its aspects is peculiarly adapted for the treatment of peaches, in other aspects the invention is not so limited but is capable of application to other types of fruit.

A preferred embodiment of the machine as disclosed in the drawings comprises a machine frame 2, Figs. 1 to 4 and 6, having side plates 4 and 6 and four feet 8 at the ends of the side plates. The side plates 4 and 6 are held in spaced relation by cross rods 10 and a top plate 12 secured by angle brackets 14 to the opposite, upstanding central portions 16 of the side plates. The top plate 12 forms the mounting base for a combined motor and speed reducer 18 which has a slow speed shaft 20, Fig. 3, driving a fruit feeding mechanism device or conveyor 22 (Fig. 1) and a high speed shaft 24 which drives a fruit splitting or sawing mechanism 26 (Fig. 1). The fruit feeding mechanism, device or conveyor 22 receives whole fruit at the left hand or feed-in end of the machine, as shown in Fig. 1, and carries each fruit to and past the splitting or sawing mechanism 26, to and past the separating and spreading mechanism 28, and to and past pitting or deseeding mechanism 30, and discharges at the right hand, or discharge end, of the machine as shown in Fig. 1, the split and pitted or deseeded half fruit.

*The fruit feeding mechanism or conveyor*

The fruit feeding mechanism device or conveyor 22 (Figs. 1, 3, 4 and 6) preferably comprises an endless conveyor consisting of a pair of sprocket chains 31 and 32 passing at the rear, discharge end of the machine over drive sprockets 34 and 35 adjustably secured, as by bolts 36 received in arcuate slots 37 in the sprockets, to collars 38 and 39 secured to a drive shaft 40 journaled in suitable bearing brackets 41 bolted to the side frame plates 4 and 6. The sprocket chains at their forward or feed-in ends pass over idler sprockets 42 and 43 rotatably mounted, between suitable positioning collars, on stationary cross shaft 44 secured at its opposite ends to flanged bosses 45 bolted to the side frame plates 4 and 6.

An elongated casting 46, Fig. 4, is bolted to the side frame plate 4 and has threaded into it a stud shaft 47. A hand wheel 48 is mounted on the outer end of a rotatable sleeve 49 on the stud shaft 47, the sleeve being connectible by a manually operable clutch 49 of any suitable construction to a drive pulley 50 journaled on the sleeve. The sleeve is connected or fixed in any suitable manner to a gear 51. The pulley 50 is driven through belt 52 (Fig. 3) from the slow speed shaft 20 of the combined motor and speed reducer 18. The gear 51 meshes with and drives a larger gear 52 journaled on a stud shaft 54 carried by the casting 46. The gear 53 has attached to it a smaller gear 55 which is also journaled on the stud shaft 54, the gear 55 meshing on one side with a drive gear 56 secured to the outer end of the conveyor drive shaft 40 and on the other side with a gear 57 secured to the outer end of a cross shaft 58 journaled in suitable brackets bolted to the side frame plates 4 and 6.

The sprocket chains 31 and 32 carry a plurality of fruit holders, cups or supporting devices 60 of which a few only are shown in Figs. 1 to 3 and 6, but it is to be understood that the entire length of the chains is provided with a continuous equally spaced series of fruit holders.

The fruit holders as they are continuously advanced by the sprocket chains each first receive a whole fruit at the delivery or feed-in station or zone at the left or front end of the machine, as shown in Figs. 1 and 6. The fruit being deposited in each holder by the operator as it is being moved continuously past or through the feed-in station or zone is positioned by the operator so that its suture plane is generally parallel to the plane of the saw blade or splitter or sawing mechanism 26. The fruit holders and their control mechanism are so designed that the whole fruit is then automatically centered by the holders so that its median plane is coincident with the plane of such blade or saw and the fruit thus being centralized is thereafter clamped in the holder which then carries the fruit without interruption in its movement past the splitting or sawing mechanism 26, the separating and spreading mechanism 24 and after being swung to open position continues without interruption in its movement to carry the split halves with their cut faces uppermost or exposed past the pitting or coring mechanism and to the discharge station or zone at the rear or right end of the machine, at which zone or station the pitted or cored fruit halves are automatically discharged from the holder as it continues in its motion without interruption with the endless conveyor sprocket chains.

Each fruit holder, cup or supporting device 60 comprises a pair of inner cup segments or sections 62 and 64, Fig. 15, and a pair of outer cup segments 66 and 68, Fig. 14. The inner wall 70 of each segment is semi-conical in form (see Figs. 13 to 15, 17 and 18). Each inner segment forms with its companion outer segment an internally cone-shaped half fruit holder when the segments are "open" or "partially open" and lie in the same plane, as seen in Fig. 13. The inner segments when in confronting juxtaposed, raised position, as illustrated in Figs. 6, 16, and 46, form an open top, whole fruit receptacle having oppositely extending, semi-conical internal surfaces confronting each other along their base planes. The four segments when in raised position, as illustrated in Figs. 6, 19, 49 and 50, form closed, whole fruit receptacles or clamps having opposed conical internal walls confronting each other along their base planes, but in spaced relation to a vertical plane coincident with the median plane of the whole fruit.

The inner cup segments or sections 62 and 64, as best illustrated in Fig. 15, are formed integrally with, or attached to, an arm or bar 72 which is joined, by a cross bar 74, to a similar but shorter bar 76. The bars 72 and 76 are formed at their inner ends with coaxial apertured bosses 78 and 80. The boss 80 is formed with gear teeth 82 so that that boss forms a gear segment. The cup segment 62 is provided with a set screw 84 threaded into its mounting bracket at the junction of its arms 74 and 76 while the cup segment 64 is provided with a boss 86 at the junction of the arms 74 and 76 of its mounting bracket and a stop bolt 88 is received in a threaded aperture in the boss 86, the bolt being held in adjusted position by the clamping nut 90. The set screw 84 and the stop bolt 88 provide adjustable means which limit the inward movement of the cups toward each other when they are swung to raised position as illustrated in Fig. 16.

It should be noted that the bar 72 of each inner cup segment is offset from the axis of its semiconical surface, as illustrated in Figs. 10 and 15, and each segment is formed at the apex of its semi-conical surface with a projection 92 having a flat outer surface 94 transverse of the axis of its conical surface.

Each outer cup segment is carried by a mounting bracket which comprises an offset arm or bar 96 joined to the cup segment at the apex thereof and providing a flat surface portion 98 (Fig. 16) which forms an abutment adapted to engage the flat surface 94 of the projection 92 of a companion inner cup segment positioning the outer cup segment and its companion inner segment in a common plane. The bar 96 is joined, by an offset arm or portion 100, to a bar 102 in turn joined by a cross bar 104 to a bar 106 parallel to the bar 102. The bars 102 and 106 are formed at their outer ends with bosses 108 and 110 coaxially apertured. The boss 110 is formed with gear teeth 112 so that this boss forms a gear segment. It should be noted that the bar 100 of the outer cup segment 66 forms an extension of the bar 102 and lies in the same plane but the bar 100 of the cup segment 68 is joined to an extension of the cross bar 104 and is offset from the bar 102 so that when the bosses of the mounting brackets are interfitted the bars 100 of the two outer cup segments will lie in the same plane.

The mounting brackets for the four cup segments are journaled on a shaft 114 which extends through the coaxial apertures in the four bosses 78 and 80 of the pair of inner cup segments and the four bosses 108 and 110 of the pair of outer cup segments, as illustrated in Figs. 9 and 10, the brackets being mounted on the shaft 114 in such manner that the boss 108 of the outer cup segment 66 is positioned between the boss 108 of the outer cup segment 68 and the boss 110 of the latter segment. The boss 78 of the inner cup segment 64 is positioned on the shaft between the boss 78 of the inner cup segment 62 and the boss 80 of the latter segment. The boss 110 of the outer cup segment 66 is positioned between the boss 110 of the other outer cup segment 68 and the boss 80 of the inner cup segment 64.

The shaft 114 is mounted in the bosses 116 of opposite end brackets 118 (Figs. 10 and 11), the shaft being held against rotation with respect to the brackets as by set screws 120. The brackets 118 are mounted on a carriage 122, shown in Fig. 11. This carriage comprises a central dependent body portion or block 124 and laterally extending arm portions 126 and 128 extending oppositely from opposite diagonal corners of the central body portion or block 124. The end portions 130 and 132 of the arms 126 and 128 are offset oppositely so that their opposite side edges are aligned. Wheels or rollers 134 for the carriage are journaled on bolts 136 threaded into the end edges of the end portions 130 and 132 of the carriage. Carriage supporting shoes or slides 138 are secured by screws or bolts 140 to the under surface of the carriage. Chain attachment links 142 and 144 (Figs. 7, 8, 11, 18 and 19) are bolted to the under surface of the end portions 130 and 132 of the carriage arms 136 and 138, the chain attachment links 142 being secured by bolts 146 and the chain attachment links 144 having their side flanges received in notches in the upper surfaces of the shoes 138 and each secured to the carriage by one of the bolts 140 by which its associated shoe is secured. It should be noted that the end portions 130 and 132 of the carriage arms 126 and 128 are recessed in their upper surfaces, as shown in Figs. 7, 11, 16 and 19, to receive the offset bars 96 of the mounting brackets of the outer cup segments so that the cup segments may be swung to an open, horizontal, or near horizontal, position, as shown in Figs. 7 and 16.

The inner cup segments 62 and 64 are operated by racks 148 and 150, Fig. 12, the rack 148 being bolted to the inner surface of a slide block 152 and extending outwardly therefrom, while the rack 150 is bolted to the opposite side edge of the block 152. An actuating roller 154 is journaled on a bolt 156 threaded into the side of the rack 148 adjacent its lower end. The outer cup segments are actuated by racks 158 and 160, the rack 158 being bolted to the inner surface of a slide 162 and the rack 160 being bolted to the opposite side edge of the same slide. An actuating roller 164 is journaled on a bolt 166, Fig. 7, threaded into the side of the rack 158. The slide blocks 152 and 162 are formed in their inner surfaces with longitudinally extending guide slots 168 and 170 receiving guide projections or splines 172 and 174 respectively formed at diagonally opposite corners of the central body portion of the carriage.

The mounting brackets 118 for the cup carrying shaft 116 are formed to provide horizontal arms 176 apertured to receive mounting bolts by which the arms are secured to opposite sides of the arms 126 and 128 of the carriage 122. Each bracket is also formed with a depending portion 178, the portions 178 of the brackets cooperating with the vertical recessed surfaces 180 of the central block 124 of the carriage to form spaced guide surfaces for the slide blocks 152 and 162 and the racks 148, 150, 158 and 160. Shoulders 182 (Figs. 7 and 11) formed at the junction of the arms with the central body portion; side surfaces 184 of the body portion 124 and surfaces 186 of the arms 126 and 128 form additional guide surfaces for the racks 148, 150, 158 and 160.

Each bracket 118 is also formed with a horizontal shelf portion 188.

A spring 190, Figs. 8, 10, 12, 16 and 17, urges the outer cup segments to raised position or to a position substantially at right angles to the carriage 122. This spring 190 is a coil spring which at its lower end encircles a pin 192 and bears upon a supporting plate 194 bolted to the lower edge of the slide block 162 and encircles at its upper end a pin 196 riveted to the shelf 188 of the bracket 118 with which the slide block 162 is associated.

It should be noted, as best seen in Fig. 9, that the rack 148 meshes with the gear teeth 82 of the mounting bracket for the inner cup segment 64; the rack 150 meshes with the gear teeth 82 of the mounting bracket for the inner cup segment 62; the rack 158 meshes with the gear teeth 112 of the mounting bracket for the outer cup segment 66, and the rack 160 meshes with the gear teeth 112 of the mounting bracket for the outer cup segment 68. Hence, as the racks 148 and 150 are lowered the inner cup segments are raised and as the racks 158 and 160 are lowered the outer cup segments are raised. The spring 190 being fixed at its upper end tends to urge the plate 194 downwardly and thereby lower the slide block 162 and the racks 158 and 160. The spring 190 therefore tends to move the outer cup segments to raised position and the offset bars 96 transmit the force of the spring to the inner cup segments when they engage the base projections 92 of the inner cup segments.

Each carriage 122 is confined or restricted, in its movements along the upper flights of the chains or conveyor, to a definite horizontal plane without deviation or deflection therefrom as it passes from the front end of the machine to the rear end of the machine between the idler sprockets 42 and 43, Fig. 4, and the drive sprockets 34 and 35. This confining, restricting or guiding of the movements of each carriage 82 is accomplished by a pair of guide tracks 193 and 195, Figs. 3 and 4, mounted on the outer ends of brackets 197 and 198 respectively secured to the side frame plates 6 and 4. The guide tracks 193 and 195 cooperate with the shoes 138 secured to the under surface of each carriage 122, the shoes riding on the upper surfaces of the guide tracks 193 and 195 so as to support the carriage against movement in a downward direction. The rollers 134 at the opposite sides of each carriage 82 engage and roll along overhanging guide tracks 200 and 202, Fig. 3, supported on the outer end of brackets 204 and 206 respectively secured to the side frame plates 6 and 4. The guide tracks 200 and 202 serve as a guide confining the carriages against upward movement from the front to the rear of the machine along the upper flight of the chains or conveyor. It will be evident that the confining or guiding tracks 192, 194, 200 and 202 serve not only a guiding function but also serve a clamping function in that they clamp the carriage against vertical movement so that by forces applied to the rollers 154 and 164 or by springs 150 to the slide block 122, the racks 148 and 150, 158 and 160 may move up or down to swing the cup segments to the various positions. These tracks serve also to take the load of the carriages off the chains so that relatively light sprocket chains or conveyor may serve to move the carriages and hence convey the fruit holders through their designed path. The movements of the carriages along the lower track of the chains or conveyor, from the rear to the front end of the machine, are guided and the carriages supported by tracks 208 and 210, Figs. 1, 3 and 6, secured to the outer end of brackets 212 and 214 respectively secured to the side frame plates 6 and 4. The rollers 134 of each carriage engage and roll on the upper surfaces of the tracks 208 and 210 and thereby support the weight of the carriages and thereby relieve the chains of that weight which would of course cause such a large sag in the chains as to preclude their proper operation.

The cup segments are moved to open positions or to partially open positions, and allowed to move to closed positions as they are moved continuously along their endless path by a plurality of cam, guide or control tracks, best seen in Figs. 4, 6 and 37. These tracks comprise a plurality of generally flat tracks 216, 218 and 220 for controlling the outer cup segments, these tracks having curved camming ends 222, 224 and 226 respectively, and the tracks 216 and 218 being interconnected at the forward end of the machine by a curved track 228 of constant radius which may be provided by a disk or collar 230 secured to the stationary shaft 44 and therefore concentric with the idler sprockets 42 and 43.

Generally flat tracks 232 and 234 control the movements of the inner cup segments independently of the outer cup segments. The track 232 has at its forward end a curved or camming end portion 236 which extends about the axis of the shaft 44. The track 234 has at its rear end a curved or camming end portion 238 and at its forward end merges into a curved track section 240 which for a portion of its length is concentric to the axis of the shaft 44 and for the remaining portion 242 of its length is of constantly decreasing radius. The track 240 may be provided by a disk or collar 244 secured to the stationary shaft 44. The disk 244 is provided with a flat upper surface portion 246 which is essentially parallel to the track 232 and in spaced relation thereto to permit free movement of the actuating roller 154 of the inner cup segment as it rolls along the track 232.

A track 248 controls the spreading movement of the four cup segments and the positioning of the four cup segments in partially open position for cooperation with the pitting or coring mechanism. This track is aligned longitudinally of the machine with track 232 so as to engage the actuating roller 154 of the inner cup segments and through the engagement of the inner cup segments with the arms or abutments 98 of the outer cup segments move the outer cup segments therewith. This track 248 has at its forward end an inclined or camming section 250 which engages below and raises the actuating roller 154. This track has also intermediately of its plane or horizontal portions a recessed portion or surface 252 which permits the actuating roller 154 to be lowered thereby raising all four cup segments slightly for proper engagement with the pitting mechanism. The track 248 at its rear end merges into a curved track or surface 254 which is concentric to the axis of the drive shaft 40 for the sprocket chains or conveyor. The guide surface 254 may be provided by a disk or collar 256 in which the shaft 40 is journaled but which is held against rotation by being pinned or otherwise secured to the stationary track 248, the track 248 being fixed to brackets 258, Fig. 4, secured to the under side of the carriage track 192. It should be noted that the portion 260 of the track 248 between the recessed portion 252 and the arcuate surface 254 is of greater height or thickness than the flat portion of the track in advance of the recess 252 so that the cup segments which as the cups reach the recess 252 are partially open will be open to even a greater extent after cups have passed the recessed portion 252. The arcuate surface 254 retains the cups in fully open position as they move around the drive sprockets 34 and 35. The tracks 216, 218 and 220 may be secured in any convenient manner, as by brackets 262, Fig. 4 (of which one only is shown), to the carriage track 194 and the tracks 232 and 234 may be similarly secured as by like brackets 264 to the under surface of the carriage track 192.

In addition, auxiliary control devices, tracks or guides 266 and 268 (Figs. 4, 6 and 37) are provided for actuating the roller 164 of the outer pair of cup segments to supply an auxiliary additional tension to the cups during the splitting and sawing operation and during the pitting operation, as hereinafter described. The track 266 comprises a bar extending longitudinally in alignment with the plane of the track 218. Track 266 is provided at its forward end with an inclined cam surface 270 under which the roller 164 is adapted to pass and to be depressed as the cup carrier advances. The track 266 is mounted on spaced bars 272 and 274, the bar 272 being secured to a rod 276 journaled in spaced brackets 278 bolted to the under surface of the carriage track 194. The bar 274 is also secured to the rod 276 but passes beyond said rod to overlie at its free end a coil spring 280 which bears at its lower end on a washer 282, Fig. 6, adjustably mounted on a vertical rod 284 supported by and upstanding from a bracket 286 bolted to the side frame plate 4. The other end of the spring 280 acting through the bar of the track 266 supplies an added spring pressure tending to depress the arms of the outer cup segments and thereby increase the clamping pressure of the cup segments when in the closed position illustrated in Figs. 19, 41 and 47. The track 268 comprises a bar carried at the outer end of a lever 288 secured to one end of a rod 290 journaled in brackets 292, Fig. 4, also bolted to the under surface of the carriage track 194. The rod 290 has secured to its opposite end a lever 294 which extends outwardly therefrom and engages and overlies a coil spring 296 mounted at its lower end on an adjustable bearing plate or washer 298 mounted on the machine frame in any convenient manner as for example in the same manner as shown in respect to the bearing plate or washer 282. The bar or track 268 is also aligned, as shown in Fig. 4, with the control track 218, control track 220, and auxiliary control track 266 so that the track 268 also serves to engage and actuate or depress the actuating roller 164 of the outer cup segment when that roller engages the inclined camming nose of the track section or bar 268. It will be evident therefore that the spring 296 serves by applying a further pressure tending to depress the actuating roller 164 to apply an auxiliary tensioning force urging the four cup segments upwardly during the pitting operation and it should be noted that, as best seen in Fig. 4, the auxiliary track section or bar 268 is aligned transversely of the machine with the relieved section 252 of the control track 248 so that at the time the cup segments are allowed by the track 248 to be raised for the pitting operation by the coil spring 190 of the cup actuator mechanism, the track 268 will apply this auxiliary force in aid of the spring 190.

*The splitting and sawing mechanism and the separating and spreading mechanism*

The splitting or sawing mechanism 26 comprises, as best shown in Figs. 1, 3, 4, 6, 20 and 21, a rotary saw 300 secured to a shaft or arbor 302 which is journaled in an arbor housing 304 which extends through suitable openings in the upstanding portion 16 of the side plates 4 and 6 and is secured to said side plates as by brackets 306 bolted to the end of the arbor housing and also bolted to the side frame plates. The arbor shaft 302 extends beyond the arbor housing 304 on the right side of the machine as seen in Fig. 3 and has secured to it a pulley driven by a belt 310 from a pulley 312 secured to the high speed shaft 24 of the combined motor and speed reducer 18. The shaft 302 also has secured to it a flywheel 314 which equalizes the rim speed of the saw while the pit of a peach is being cut in two.

The saw arbor housing 304 is also supported by a bracket 316 having an upper horizontal plate portion 318, Fig. 1, bolted to the top plate 12 and the lower horizontal plate portion 320 bolted to the saw arbor housing.

The separating and spreading mechanism 28 comprises a pair of separating or deflecting blades 322 and 324. The blade 322 is secured by a recessed head screw or by spot welding or any other convenient manner, to the lower end of vertical arm 326 of a bracket 328 having a rearward extending horizontal portion 330 and a transverse arm portion 340 terminating in plate portion 342 bolted to the bottom arm 320 of the bracket 316.

The blade 324 is similarly secured to the lower end of the vertical arm 344 of a bracket 346 having a lateral arm 348 terminating in a plate portion also bolted to the arm 320 of the bracket 316. The blades 322 and 324 are provided with tapered front vertical end edges 350 and 352 which are as close to the saw as it is permissible. The blades extend straight and parallel to the plane of the saw throughout the section 354 of each blade, which section is preferably one and one-half inches in length so that the rear edge of the peach will clear the saw at the time the front edge of the peach reaches the rear edges of the sections 354 of the two blades 322 and 324. The blades 322 and 324 then diverge away from the plane of the saw in both the horizontal and the vertical directions or planes. The divergence of the sections 356 and 358 of the blades 322 and 324 in the horizontal plane is best illustrated in Fig. 21, which is a top view of the blade and shows the maximum horizontal divergence of the blades at the top edge. The divergence of the blades in a vertical direction is illustrated in the perspective view of Fig. 24. During the period when sawed or split fruit halves are passing along the sections 356 and 358 of the deflecting blades, the fruit cups are moving outwardly. The divergence of these sections of the blades in both the horizontal and vertical directions, serves to keep the faces of the blades in engagement with, or in close parallelism to, the changing plane of the exposed faces of the fruit halves as the cups thus swing outwardly. The separating blades thus serve to hold the fruit halves in the cups as the cups swing outwardly through a certain angle or portion of their opening movement.

The separating or deflecting and spreading mechanism 28 also includes a pair of spreader blades 360 and 362. These blades are secured by recessed screws, spot welding or any other convenient manner to the outer longitudinal edges of levers 364, 366, 368 and 370. These levers are formed at their lower ends with apertured bosses which receive common drive shaft 372 on which the boss of each of the levers is journaled. It should be noted that, as shown in Fig. 21, the drive shaft 372 is positioned so its axis lies in extension of the plane of the saw. The shaft 372 is journaled in a relatively long boss 374 formed at the lower end of a vertical arm 376 of a bracket 378 bolted to a cross bar 380 extending between the upstanding central portions 16 of the side frame plates 4 and 6 and bolted to the lateral arms of suitable brackets such as 382, shown in Fig. 1. The spreader blades or wings 360 and 362 are each formed of two sections 364 and 386 for the blade 360, and 388 and 390 for the blade 362. The forward sections 384 and 388 of the spreader blades diverge in both horizontal and vertical planes and these sections constitute, when the spreader blades are in closed positions, extensions of the divergent sections 356 and 358 of the stationary separating or deflecting blades 322 and 324. The rear sections 386 and 390 of the spreader blades diverge in a vertical direction but are parallel in the horizontal planes, as best seen in Fig. 21. The sections 384 and 388 serve to continue the separating or deflecting of the half peaches while the half peaches are moving over the sections. The sections 386 and 390 extend in the horizontal direction, parallel to the mouths of the half cups and move outwardly as the half cups open. The sections 386 and 390 therefore serve to seat or reseat the half peaches in the half cups as those half cups reach spread or open position for movement under the following pitting mechanism. It should be noted that the spreader blades are provided with horizontal ribs 392 beginning at the forward ends of the blades and extending at least part way along the sections 386 and 390 of the blades. These ribs serve to keep the fruit halves from turning during the time that they are pushed along the surfaces of the spreader blades by the cups. These ribs also serve to break any suction between the flat faces of the peach halves and the surfaces of the spreader blades.

The spreader blades 360 and 362 are preferably formed of light sheet metal and are reinforced by the lever arms 364 and 370 and angular cross bars 394 and 396 extending between the lever arms and preferably formed integrally therewith. The lever arms 368 and 370 are formed with laterally extending portions or cranks 398 and 400 carrying rollers 402 and 404. These rollers are received in U-shaped yokes 406 and 408 peened to the lower ends of plunger rods 410 and 412 slidably mounted in tubes or sleeves 414 and 416 having their upper ends of reduced diameter externally threaded and received in threaded apertures in the cross bar 380. Lock nuts 418 clamp the tubes 414 and 416 in adjusted position determining the closed or upper positions of the spreader blades so that the forward sections 384 and 388 are properly aligned with the rear sections 356 and 358 of the stationary separating or deflecting blades.

Rubber bumper strips 420 and 422, Fig. 24, are engaged by the spreader blades as they snap or move to the closed position and align themselves with the separating or deflecting blades. These rubber bumpers 420 and 422 are carried by a plate 424 having opposite side edges inclined parallel to the plane of inclination of the sections 386 and 390 of the spreader blades. The plate 424 is bolted to a bracket 426 in turn bolted to the arm 340 of the bracket 328.

Plunger rods 410 and 412 are interconnected at their upper ends by a cross bar 428 into which the upper ends of the plunger rods are threaded and to which they are locked by clamping nuts 430. Coil springs 432 are interposed between the lower clamping nuts 418 and washers 434 clamped between an enlarged shank portion of each plunger rod and the cross bar 428. The central portion 436 of the cross bar 428 is rounded and received between the furcations of a bifurcated lever 438 pinned to a shaft 440. The shaft 440 is journaled in a boss 442 of a bracket 44 bolted at its lower end to the cross bar 380. The lever or crank 446 is pinned to the opposite end of the shaft 440. A hook-like member or ratchet bar 448 is pivoted to the lower end of the lever crank 446 and extends rearwardly therefrom. The member 448 is formed with a ratchet tooth 450 in the under surface of the bar and with an outer inclined or camming surface 452. A bar 454 bolted at the forward end of the bracket 444 extends rearwardly therefrom and is provided at its outer end with a longitudinal slot 456 which receives a stud 458 clamped in the slot in adjusted position in any desired manner. The stud 458 carries a roller 460 which lies in the path of movement of the member or ratchet bar 448 and cooperates with the camming surface 452 of the ratchet bar to cause it to pivot at its point of connection 462 to the crank 446 in a counter-clockwise direction whenever the bar in moving rearwardly brings the surface 452 in engagement with the roller 460. The ratchet bar 448 is moved rearwardly by driving dog 464 carried by a bracket 466 secured, as hereinafter described, to the pitter mechanism 30 so as to move back and forward with the pitter mechanism. The dog 464 is positioned in the same vertical plane with the ratchet bar 448 and hence when the dog 464 moves rearwardly its toothed rearward edge 468 engages the ratchet tooth 450 of the ratchet bar 448 and hence moves the bar rearwardly until it is engaged by the roller 460 and raised to release the ratchet bar 448 from the dog 464. It will be evident that as the ratchet bar 448 is moved rearwardly, the lever or crank 446 is swung in a counter-clockwise direction, as seen in Fig. 25, to cause a like counter-clockwise rotation of the bifurcated lever 448 and hence simultaneous depression of the plunger rods 410 and 412 to cause simultaneous outward swinging or opening of the spreader blades. On release of the ratchet bar 448 from the driving dog 464, the springs 442 cause raising of the plunger rods thereby to close or raise the spreader blades and simultaneously rotate the levers 438 and 446 in a clockwise direction to the original position and return the ratchet bar 448 to its forward initial position.

*The pitting or deseeding mechanism*

The pitting, deseeding or coring mechanism 30 (Figs. 1 to 3 and 26 to 36) comprises a traveling frame 470, best shown in Fig. 35. As there shown, the frame comprises longitudinal bar portions or arms 472 and 474 joined adjacent their forward ends by an integral cross bar 476. The frame 470 is pivotally mounted, by studs 478, on the upper ends of parallel links 480, 482, 484 and 486, Figs. 26 to 28, 31, 33 and 34. The parallel links 480, 486 are journaled on parallel cross shafts 488 and 490, Figs. 1 to 3, mounted in the bosses of brackets such as 492 bolted to side frame plates 4 and 6. The pitter head frame 470 is moved rearwardly of the machine but "forwardly" with respect to the moving fruit cups from the "rearward" position of Fig. 1 to the "forward" position of Fig. 2 by a rod or bar 494, Figs. 4 and 5, pivotally connected at its rear end as by stud bolt 496 to the mounting link 486 for the pitter head frame. The bar 494 is driven by a cam 498 secured to the end of the shaft 58. The bar 494 is provided with a cam roller 500 which is received in an internal cam track 502 of the cam 498 and the bar is also provided with a slot 504 through which the shaft 58 extends so that the shaft serves as a guide for the bar. The pitter head frame carries a pair of pitter knife mechanisms 506 and 508, Fig. 33; a pair of pitter pad and knock-out assemblies 510 and 512, Figs. 26 and 34, and a pair of pitter knife operating mechanisms 514 and 516, Fig. 28.

The pitter knife mechanisms comprise four curved pitter blades or scoops 518 and 520, 522 and 524 mounted as pairs, the pitter blades 518 and 520 being bolted to bars 526 and 528 while the blades 522 and 524 are bolted to bars 530 and 532. The bars 526 and 528, Fig. 34, are formed with right angle end portions forming bosses 534 at one end and 536 and 537 at the other end. The boss 536 is pinned to a shaft 538 and the boss 537 is pinned to a sleeve 540 carried by the boss 542 of a bracket 544, best shown in Fig. 36. The bracket 544 comprises a generally triangular vertical portion 546 having a horizontal plate portion or shelf 548 and having the boss 542 and a like boss 550 formed integrally with the plate portion 548 at the base corners thereof. The shelf 548 rests upon the cross arm 476 of the pitter head frame 470 and is secured thereto as by bolts as 552 (Figs. 26 to 28 and 32), received in slots 554 in the shelf 548 and threaded in the cross arm 476. The slots 554 permit ready adjustment of the bracket 544 laterally of the pitter head frame so that the pitter knife mechanisms 506 and 508 and the pitter pad asemblies 510 and 512 may be readily adjusted with respect to the central longitudinal vertical plane of the machine and hence properly aligned with respect to the fruit cups. The pitter knife mounting bars 530 and 532 of the pitter knife mechanism 508 are identical to the pitter knife mounting bars 526 and 528 of the pitter knife mechanism 508 and have bosses 556 (Fig. 32) similarly secured to a drive shaft 558 and sleeve 559 journaled in the boss 550.

The bosses 534 of the knife mounting bars 526 and 528 receive a stud 560, Fig. 34, bolted to the depending flange or leg 562 of a mounting bracket 563 having a plate portion 564 extending over the knife mounting bars and an upstanding flange or arm 566 bolted to the vertical plate portion 546 of the bracket 544. The knife mounting bars 530 and 532 are similarly provided with bosses 568 corresponding to the bosses 543 and similarly receiving a stud 570 bolted to the depending leg 572 of a bracket 573 having a plate portion 574 extending over the knife mounting bars 530 and 532 and having an upstanding flange 576 also bolted to the vertical plate portion 546 of the common bracket 544. As clearly seen in Fig. 33, the brackets 563 and 573 are so mounted that the plate portions 564 and 574 are inclined to the vertical at equal, opposite angles and are symmetrically disposed with respect to the longitudinal central vertical plane of the machine.

The pitter pad assemblies 510 and 512 comprise main hold-down pads or plates 578 and 580 respectively, contacting the exposed surfaces of the fruit halves when properly positioned by the fruit cups. These main pads are centrally apertured at 582 and 584 to expose the pit or seed containing section of the fruit halves to permit passage of the seeding or pitting knives into engagement with exposed faces of the fruit halves and around the pit or seed containing section. The main pads or plates 578 and 580 are adjustably mounted by bolts 586 and 588 (Figs. 26 and 34) on the plate portions 564 and 574 of the brackets 563 and 573. The pitter pads 578 and 580 may be adjusted, by adjustment of the bolts 586 and 588, toward and from the fruit holding cups so that the pitter, by change in pitter blades, may be made to accommodate different sizes of fruit halves.

Figure 33:
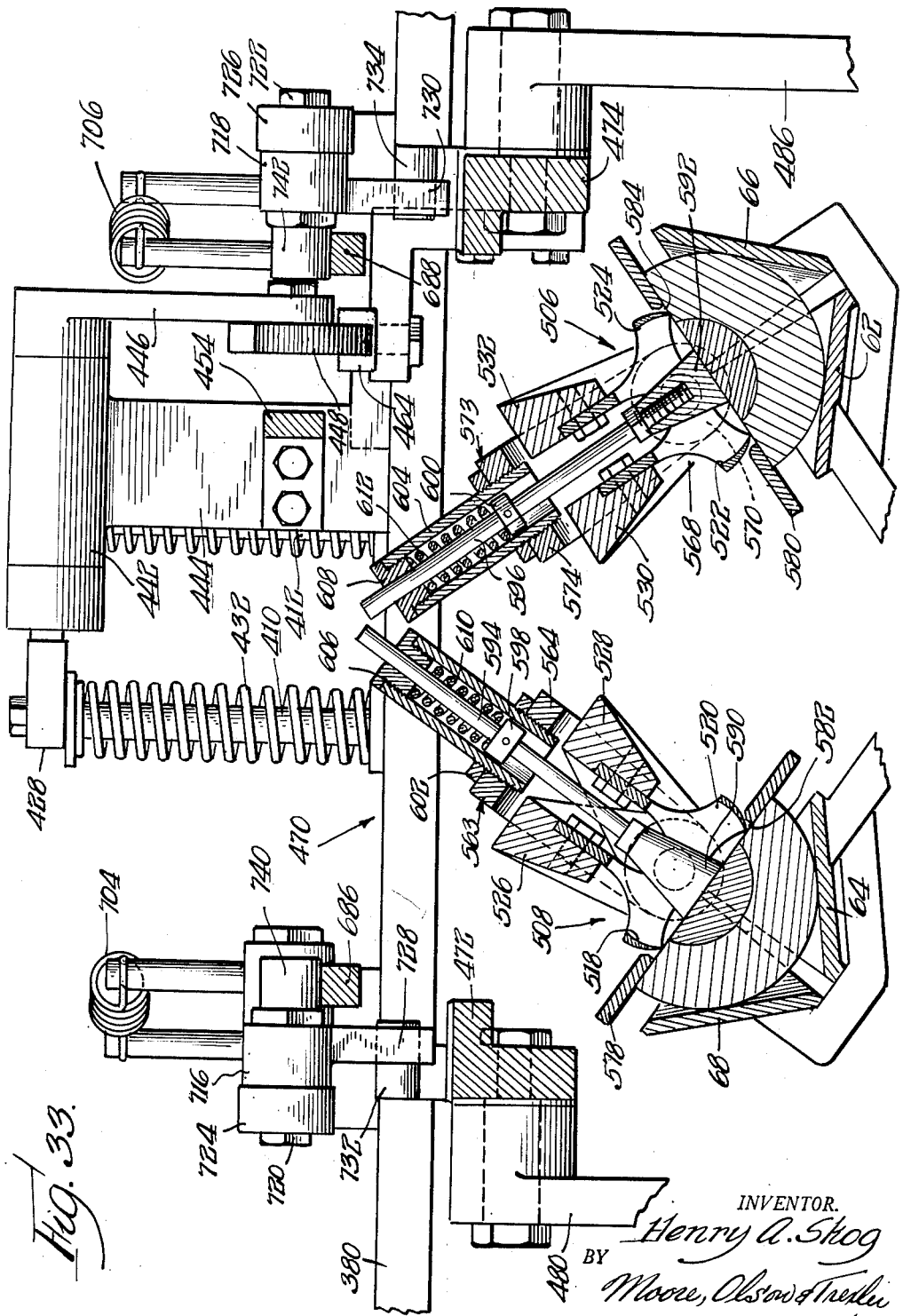
Fig. 33 is an enlarged view in vertical cross section taken along the line 33—33 of Fig. 26.

The pad assemblies also comprise knock-out pads 590 and 592 positioned at the centers of the apertures 582 and 584 of the main pitting pads. The knock-out pads are threaded on plunger rods 594 and 596 having pinned to them collars 598 and 600 slidably mounted in tubes 602 and 604 threaded into the plate portions 564 and 576 of the brackets 563 and 573. The plungers 594 and 596 are also slidably mounted in plugs 606 and 608 threaded into and closing the upper ends of the tubes 602 and 604. Coil springs 610 and 612 are interposed between the collars 598 and 600 and the plugs 606 and 608 and therefore normally urge the knock-out pads 590 and 592 downwardly so that their lower surfaces are normally disposed below the planes of the lower surfaces of the main pads 578 and 580. The springs of the knock-out pad assemblies readily yield as the fruit halves are brought by the raising of the cups into engagement with the main pads so the knock-out pads are moved upwardly to have their lower surfaces in the planes of the lower surfaces of the main pads when the fruit halves are brought into engagement with the main halves as shown in Fig. 33. These knock-out pad assemblies apply, through the pits or seed sections of the fruit halves, a compressive force on the flesh of the fruit in the path of the pitting knives so that the pitting knives make a clean cut about the pits or seed containing sections. On dropping of the cups away from the main pitter pads after the pitting has been accomplished, springs 610 and 612 push the knock-out pads out or downwardly to free them from the main pads should they stick thereto.

The pitter knife operating mechanisms 514 and 516 comprise gear segments 614 and 616 (Figs. 28 to 30) pinned to the drive sleeve 540 for the pitter knife mounting bar 528 and to the similar drive sleeve for the knife mounting bar 530. The segmental gear 614 interfits with a segmental gear 618, as shown in Fig. 29, so that the teeth of the segmental gears lie in the same transverse plane. Segmental gear 618 is pinned to the drive shaft 538 for the pitter knife mounting bar 526 for the pitting knife 518. The segmental gear 616 interfits in a similar manner with segmental gear 620 similarly pinned to the drive shaft 558 for the knife mounting bar 532 for the pitting knife 524. The segmental gears 614, 616, 618 and 620 respectively, intermesh with rack bars 622, 624, 626 and 628, the rack bars 622 and 626 being bolted to a cross head 630 and the rack bars 620 and 624 being bolted to a cross head 632. The cross heads 630 and 632 are bolted at their upper ends to rack bars 634 and 636 slidably mounted in guides formed by the front faces of bracket plates 638 and 640, Figs. 31, 32 and 34, and between the side guards 642.

644, 646 and 648, Fig. 28, bolted to the brackets 638 and 640.

The brackets 638 and 640 have inturned foot portions 650 bolted to the shelf 548 of the bracket 544 as by bolts 652. The cross heads are raised, to turn the pitting knives to open, initial position following the pitting operation, by spring action. For that purpose the cross heads 630 and 632 are provided with threaded rods 654 and 656 threaded into lateral shelf portions 658 of the cross heads and slidably mounted in shelf portions of brackets 660 and 662 bolted to the brackets 638 and 640 and provided with suitable slots therethrough to permit passage of the rack bars 634 and 636. The rods 654 and 656 above the shelves of the brackets 660 and 662 are encircled by coil springs 664 and 666, which bear at their lower ends on the brackets 660 and 662 and at their upper ends on suitable washers which underlie nuts 668 threaded on the upper ends of the rods 664 and 666. The cross heads 630 and 632 are moved downwardly by the clockwise rotation of the segmental gears 670 and 672 meshing with rack bars 634 and 636. The segmental gears 670 and 672 are secured to shafts 674 and 676 respectively journaled in bosses formed at the upper ends of the brackets 638 and 640. The operating cranks 678 and 680 are secured to the outer ends of the shafts 674 and 676 and these cranks carry at their lower ends inwardly extending operating studs 682 and 684.

The parts of the pitter knife drive mechanism thus far described move backwardly and forwardly with the pitter head. The operating cranks 678 and 680 thus move backwardly and forwardly with the pitter head frame 470 and during the "forward" motion of the frame the studs 682 and 684 are engaged by stationary bars 686 and 688 (see Fig. 27) having shouldered or toothed end portions 690 and 692 normally urged into the path of movement of the studs 682 and 684. The bars 686 and 688 are pivoted at their inner ends on stud bolts 694 and 696 carried by the forward extending arms 698 and 699 of brackets 700 and 702 bolted to the cross bar 380. The bars 686 and 688 are urged in a counter-clockwise direction, as seen in Figs. 27 and 31, by coil springs 704 and 706 secured at their outer ends to pins 708 and 710 upstanding from the pivot bosses of the bars. The springs 704 and 706 have secured to their other ends pins 712 and 714 upstanding from the brackets 700 and 702.

Release of the bars 686 and 688 from the studs 682 and 684 at the end of the pitting operation is accomplished by triggers 716 and 718, which comprise bell cranks journaled on stud bolts 720 and 722 secured to forwardly extending laterally offset arm portions 724 and 726 of the arms 698 and 699 of the brackets 700 and 702. The trigger bell cranks 716 and 718 have dependent arms 728 and 730 respectively positioned in the path of operating dogs or cams 732 and 734 movable with the pitter head frame 470 and bolted to the arms 472 and 474 of that frame. The other arms 736 and 738 of the trigger bell cranks 716 and 718 are formed with integral inwardly extending lugs or cams 740 and 742 which overlie the bars 686 and 688 and are adapted, when the trigger bell cranks are moved in a counter-clockwise direction by the dogs 732 and 734, to depress the bars 686 and 688, thereby releasing the toothed ends 690 and 692 from the operating studs 682 and 684.

Operation of the machine

The combined motor and speed reducer 18 continuously drives the conveyor 22, as previously described, by continuously rotating the shaft 40 in a clockwise direction, as seen in Fig. 1, to cause the upper flights of the conveyor chains 31 and 32 to pass from the lefthand or feed-in end of the machine to the righthand or discharge end of the machine.

As each fruit holder, cup or supporting device 60 moving along the lower flights of the chains approaches the feed-in end of the machine, the actuating roller 154 for the inner cup segments 62 and 64, and the actuating roller 164 for the outer cup segments 66 and 68, engage the ends of the cam, guide or control tracks 234 and 216 respectively, Figs. 6 and 37, and depress the rack bars 158 and 160 to move all of the cup segments from the depending closed position illustrated at the bottom of Fig. 6 to the spread or opened position illustrated in Fig. 44. In this spread or open position the cups move until the actuating roller 154 for the inner cup segments engages the portion 242 at the forward end of the track 234 and the curved end portion 236 of the track 232. These portions of the tracks 232 and 234 cause and permit the roller 154 to move away from the turning axis 114 of the inner cup segments so that the inner cup segments move toward closed position, as illustrated in Fig. 45. This movement of the inner cup segments occurs of course as the fruit cups or holders move about the axis of the idler sprocket shaft 44 at the feed-in end of the machine.

As illustrated in Fig. 37, the portion 228 interconnecting the tracks 216 and 218 is concentric to the axis of that sprocket shaft and consequently the roller 164 moving along this track section maintains the outer cup segments in spread or open position, as illustrated in Fig. 45. In this position the cups move to the feeding-in zone which begins at the point where the mouth of the receiving cup formed by the now closed inner cup segments faces upwardly.

The cup segments being positioned as illustrated in Fig. 46, the operator deposits the whole fruit, such for example as a peach, into the open mouth cup formed by the inner cup segments, as illustrated in Fig. 46, with its stem indent facing in the direction of movement of the cups and its tip indent seam in a vertical plane so that the suture plane of the peach extends in a vertical direction. The depositing of the whole peach in the open mouth cup may be accomplished at any time prior to the closing movement of the outer cup segments, which action takes place when the actuating roller 164 of the outer cup segments reaches the curved end portions 224 and 226 of the tracks 218 and 220. The curved track section 224 of the track 218 permits the roller 164 of the outer cup segments to move downwardly with the rack bars 158 and 160 under the action of the closing spring 190. The curved portion 226 of the track 220 serves as insurance against sticking of the closing mechanism by causing positive depression of the roller 164 of the actuating mechanism of the outer cup segments.

It should be noted that the control track 232 terminates at its rear end substantially in the same plane as the ends of the tracks 218 and 220 so that the actuating roller 154 for the inner cup segments is freed from the track 232 substantially at the same time that the roller 164 passes from the ends of the tracks 218 and 220. Accordingly, as the outer cup segments move under the action of the spring 190 or the track 220 toward closing position, they first move to the fruit engaging position shown in Fig. 47 where the bottom semi-conical surface of each outer cup segment engages opposite sides of the whole peach above the closed inner cup segments. The tapered semi-conical bottom surface of the outer cup segments therefore exerts a component of force on the peach which is in a downward direction and therefore as the outer cup segments continue to move toward closed position the whole fruit is moved downwardly in the cup formed by the inner cup segments. The actuating mechanism for the inner cup segments being freed from control of the track 232, the force exerted on the peach in a downward direction by the closing outer cup segments exerts a component of force on the inner cup segments in a horizontal direction to cause these inner cup segments to spread, as indicated in Fig. 48, until the abutments 92 of the inner cup segments engage the stop portions 98 of the arms or bars 100 of the outer cup segments and the outer edges of the outer cup segments then lie in the same planes as the outer edges of the inner cup segments, all as illustrated in Fig. 49.

Since the outer cup segments are interlocked by the mounting of the rack bars on a common slide block, and the positions of the inner cup segments determined by the positions of the outer cup segments, the companion inner and outer cup segments on opposite sides of the fruit must always be spaced the same distance from the vertical plane through the axis of rotation of the common shaft 114 of the four cup segments. Therefore, regardless of the size and contour of the peach, the fruit is always centralized with respect to that plane, i. e., the geometrical center of the fruit will always lie in the vertical plane through the axis of rotation of the common mounting shaft 114 for the four cup segments, as indicated in Fig. 49. The fruit is clamped in that centralized position by the cup segments and under the pressure of the closing spring 190.

As illustrated in Fig. 50, the sawing, splitting or severing blade 300 lies in the vertical plane through the axis of the common mounting shaft 114 for the cup segments and the fruit is therefore, as previously described, centralized with respect to the plane of the sawing or splitting blade.

As the conveyor therefore moves continuously it carries the fruit holder containing the whole fruit to and across the splitting blade and onto and along the separating blades and onto the spreader blades. The splitting, separating and spreading of the whole fruit into two equal parts or halves is illustrated in Figs. 38 to 43. and 50 to 55. When the fruit reaches the splitting or sawing blade 300, the actuating or control roller 164 for the outer cup segments engages the camming portion 270 of the auxiliary track or guide 266, which track is urged downwardly by the spring 280 and that spring therefore acting through the track 266 and the roller 164 applies an additional or auxiliary clamping pressure preventing shifting of the fruit in the cup or holder as the fruit is carried past the sawing or splitting blade. It should be noted that this track 266 terminates substantially at the point where the sections 356 and 358 (Figs. 21 and 24) of the separating blades diverge from the straight parallel portions 354 of these blades so that the additional clamp pressure is removed between the time that the cups and fruit halves move from the position of Figs. 39 and 51 to the position of Figs. 40 and 52, where the separating of the fruit and cups has been initiated.

As the fruit reaches the diverging sections 356 and 358 of the separating blades, the actuating roller 154 for the inner cup segments reaches the camming forward end portion 250 of the track 248 and hence as the conveyor continues to move the camming portion of the track 248 raises the rack bars 148 and 150, thereby swinging the inner cup segments away from each other and because of the engagement of the abutments 92 of the inner cup segments with the arms or bars 100 of the outer cup segments, the outer cup segments are simultaneously moved away from each other, as illustrated in Fig. 52. Thereafter, as the roller 154 moves along the camming portion 250 of the track 248, the fruit moves along the divergent sections 356 and 358 of the separating blades 322 and 342 and onto the spreader blades 360 and 362. As illustrated in Figs. 40 to 43, the separating blades diverging both in the vertical and the horizontal direction, cause the fruit halves to follow the outward or opening movement of the opposite pairs of cup segments. This double divergence of the blades insures the retention of the fruit halves in the opposite pairs of cup segments notwithstanding the tendency of the fruit halves to stick to the blades.

It should be noted that the cup segments swing about an axis which is offset from the separating blades. The doubly divergent blades insure that the fruit halves will properly follow the opening movement of the continuously traveling cups. Blades which diverge only in the one plane, i. e., horizontal plane, would cause the fruit halves, which have a tendency to stick to the blades, to move in a path different from the path taken by the cup segments as the opposite cup pairs progressively swing from each other while traveling at a continuous uniform rate from end to end of the separating blades.

The forward ends of the opposite spreading blades 360 and 362 constitute a continuation of the separating blades 322 and 324 so that while the fruit is being moved onto the spreader blades and the traveling cup sections are continuing their progressive opening movement, the fruit is caused to follow the separating movements of the cup sections, as illustrated in Figs. 41 and 53. When the fruit halves have been moved to the position shown in Fig. 20, the traveling frame 470 of the pitting mechanism has begun its "forward" movement under the control of its actuating cam 498, Fig. 4. As the pitter head frame thus moves forwardly or to the right, as seen in Fig. 27, the driving dog 464, carried by the pitter frame, as illustrated in Figs. 25, 26, 31 and 32, also moves forwardly or to the right in these figures. As the dog 464 moves to the right it engages the ratchet tooth 450 of the ratchet bar 448 and causes that bar to move forward, thereby swinging the lever 462 and hence the shaft 440 in a clockwise direction, thereby, through the crank 438, depressing the plungers 410 and 412. Such depression of the plungers 410 and 412 causes the operating cranks 398 and 400 of the spreader blades to be moved downwardly, thereby swinging the spreader blades about their common mounting shaft 372.

The fruit halves having reached the position as indicated in Fig. 20, the spreader blades, the fruit halves, and the opposite cup sections swing outwardly in synchronism, the doubly divergent sections of the spreader blades causing the fruit halves roughly to follow the movements of the cups although to be tilted therein, as illustrated in Figs. 41 and 53.

The spreader blades and the cups continue progressively to swing toward open position while the cups move continuously, carrying the fruit halves along the spreader blades until the fruit halves reach positions where the fruit halves have substantially left the doubly divergent sections of the spreader blades and are in contact with the singly divergent sections 386 and 390 of the spreader blades so that as the blades continue to open and the cups continue their travel carrying the fruit along the spreader blades, the fruit halves are shifted in the cup sections as illustrated in Figs. 42, 43, 54 and 55, so that the cut faces of the fruit halves are substantially parallel to the mouth or edges of the cup sections. Figs. 42, 43, 54 and 55 illustrate the spreading movements of halves of an average size peach. Larger or smaller halves will not be spread exactly parallel to the mouths of the cups but will be left slightly tilted therein and will be quickly straightened out by the pitting pads.

By the time the cup sections and spreader blades reach the position illustrated in Figs. 43 and 55, the spreader blades have completed their opening movement and at that time the camming surface 452 of the ratchet bar 448, Fig. 25, has engaged the roller 460 which is stationary, and the ratchet bar is thereby raised out of engagement with the operating dog 464 and the ratchet bar being released therefrom, the blades 432 cause the plungers 410 and 412 to be rapidly lifted and the spreader blades to be quickly moved to their closed position, as illustrated in Figs. 21 and 24, ready to receive the next oncoming fruit.

The cup sections, however, continue their opening movement, as illustrated in Fig. 56, but by this time the fruit halves have been moved to such an angle of inclination with respect to the horizontal plane that they of their own weight follow the further movement of the cup sections, as illustrated in Fig. 56.

It should be noted that the horizontal ribs 392 of the spreader blades perform a very important part in connection with the dropping of the fruit halves from the spreader blades because these ribs not only serve to prevent the fruit halves from turning while they are being pushed along the spreader blades but also serve to break any suction between the cut faces of the peach halves and the surfaces of the spreader blades so that the peach halves do not stick to the spreader blades but drop freely therefrom when the blades have attained a fully open position.

The half fruit holders or cup sections having been moved to their fully opened position, and the cam roller 154 having moved from the camming surface 250 of the track 248 to the first level section of the track, the cup sections are held in an open position by the track 248 as they are brought under the pitter mechanism, which is at that time stationary in its "rearward" position.

It has been previously pointed out that the spreader blades are operated during the forward traveling movement of the forward pitter frame 470 as it travels forwardly to pit the fruit halves in advance of the fruit halves being spread by the spreader blades. By the time the thus spread fruit halves have been brought by the cup sections under the pitter mechanism, the pitter mechanism has completed its pitting function and has returned to its rearward position and now again begins its forward movement. The fruit halves having been brought under the pitting mechanism, the actuating roller 154 of the inner cup segments reaches the depressed portion or recess 252 in the control track 248 and this permits the roller to move downwardly, the spring 190 swinging the outer cup segments upwardly, and, because of the engagement of the abutments 92 of the inner cup segments with the bars 100 of the outer cup segments, the inner cup segments are simultaneously swung with the outer cup segments to position the exposed or cut faces of the half fruits in engagement with the under surfaces of the pitter plate of the main hold-down pads or plates 578 and 580 of the pitter mechanism, as illustrated in Figs. 33 and 58. The knock-out pads 590 and 592 normally extend below the main hold-down pads or plates 578 and 580 but as the fruit halves are swung upwardly into engagement with the main pads or plates, the seed containing sections or pits of the fruit halves engage the knock-out pads and move them upwardly against the urging of their springs 610 and 612 until the lower face of the knock-out pad lies substantially in the plane of the lower surfaces of the main holding pads or plates.

It should be noted that as the pitting frame moves "forwardly" it is raised somewhat as its parallel, mounting links 480, 482, 484 and 486 swing about their pivot points. The recess 252 in the control track 248 is of such depth as to permit the cups to swing upwardly in synchronism with this raising of the pitter frame and consequently to follow the rising movement of the hold-down pads or plates 578 and 580 and the equal movement of the pitting knives. As the roller 154 of the inner cup segments traverses the depressed portion or recess 252 in the control track 248 the roller 164 of the outer cup segments engages the beveled end of the auxiliary track 268 and the spring 296 acting through this auxiliary track applies an additional force auxiliary to the spring 190 of the outer cup segment 190 to increase the pressure of engagement of the fruit halves with the main holding pads or plates 578 and 580.

As the pitting frame continues to move forwardly in synchronism with the continuous movement of the cups carrying the fruit halves, the studs 682 and 684, Figs. 26 to 28, and 31 and 32, engage the toothed end portions 690 and 692 of the bars 686 and 688. Therefore, as the pitter head frame continues its forward movement the operating cranks 678 and 680 of the pitter knife actuating mechanisms are swung in a clockwise direction, as seen in Figs. 27, 31 and 32. The consequent rotation of the shafts 674 and 676 and the segmental gears 670 and 672 carried thereby causes the downward movement of the racks 634 and 636 and the cross heads 630 and 632. The downward movement of the racks 622, 624, 626 and 628 carried by the cross heads causes simultaneous opposite rotation of the gear segments 614 and 618 and the simultaneous opposite rotation of the gear segments 616 and 620, thereby causing the shaft 538, Fig. 34, and the sleeve 540 to rotate oppositely and also cause the drive shaft 558 and sleeve 559, Fig. 32, to rotate oppositely.

The opposite rotation of the sleeves and their respective shafts causes the bars 526 and 528, and the bars 530 and 532 to swing apart and the pitting knives 518, 520, 522 and 524 to swing through the flesh of the fruit about the seed-containing section or pit until the edges of the cutters meet beneath the seed-containing section or pit to thereby sever the pits from the fruit halves.

As the pitting head frame approaches its forward limit of movement, the dogs or cams 732 and 734, Figs. 27 and 31, engage the dependent arms 728 and 730 of the trigger bell cranks 716 and 718 and swing them in a counter-clockwise direction. The counter-clockwise motion of these trigger bell cranks causes the lugs 740 and 742 to engage and depress the bars 686 and 688, thereby releasing the operating studs 682 and 684 of the pitter knife actuating mechanism.

The springs 664 and 666 raise the cross heads 630 and 632, thereby opening the pitting blades. The pitting blades having been opened, the pitting head frame substantially reaches its forward limit of movement and at the same time the actuating roller 154 for the inner cup segments reaches the end of the depressed portion or recess 252 on the track 248 and engages the curved, camming surface at the end of the recess so that the roller 154 is raised, thereby swinging all the cup segments to open position against the urging of the spring 190, as shown in Fig. 59.

As the cups with the pitted fruit halves move downwardly away from the main holding pads or plates 578 and 580, the knock-out pads 590 and 592 operate, under the action of their springs 610 and 612, to knock the pits down onto the peaches from which they were cut, or at least to drop the pits so they will not fall onto the oncoming half peaches to cause interference with the proper pitting of the subsequent peaches. This knock-out pad serves not only to knock the pit down but also serves to apply through the pit a force tending to compress the flesh of the peach in advance of the pitting knife blades so that they make a smooth, clean cut in the flesh of the peach. The knock-out pads serve also to apply through the excised pits a downward force on the peach halves so that any tendency of the peach to stick to the main holding pads is overcome and the peach is caused to follow the opening movements of the cups following the pitting operation.

In opened position as shown in Figs. 1 and 59, the fruit cups swing concentrically about the axis of the sprocket shaft 40 and drop or discharge the pitted or deseeded fruit halves onto a feed conveyor (not shown) or into a suitable receptacle (not shown) at the discharge end of the machine.

The pitting mechanism disclosed herein constitutes an improvement over that disclosed in applicant's co-pending application, Serial No. 747,299, filed May 7, 1947, and of which the present application is a continuation-in-part. As shown in that application, and the same applies to the improved pitting mechanism shown herein, the pitting of the fruit is accomplished while the pitting head frame is traveling in its forward direction of movement and while it is rising along an arcuate path from its rear limit of movement to its forward limit of movement. Each half fruit holder rises into engagement with the pitting plate during the initial forward and upward movement of the pitting head and descends from the pitting head during the latter but still rising portion of the path of movement of the pitting head. In that prior filed application the pitting mechanism is constructed to pit single fruit halves consecutively and a single pitting mechanism is carried by the pitter head frame, whereas the pitting mechanism, which forms part of the present invention, provides a pair of pitting mechanisms cooperatively related and coordinated in operation simultaneously to pit both halves of a whole peach initially fed into the machine and to pit half peaches held in cups which swing or pivot about a fixed axis so that the pitting is accomplished while the fruit half is positioned at an inclination to a horizontal plane. Generic claims to the pitting mechanism will be found in said prior filed application, while claims to the improvements thereon and to the pitting mechanism in combination with the elements and mechanisms of the present machine will be found herein.

From the foregoing it will be apparent that applicant has provided a machine which is continuous in operation to handle and process fruit at a high rate; a machine which is adapted to receive whole fruit, centralize it with respect to a predetermined plane, split it along said plane as it is being continuously fed, separate or spread the split halves as they are continuously fed beyond the splitting zones, raise the split halves simultaneously into engagement with a traveling pitter mechanism which pits both halves as they are continuously fed through the machine and finally discharge the pitted halves. Applicant has provided, in a continuous fruit treating machine, conveyor means which receives whole fruit, carries it past splitter means and spreader devices, and thereafter carries the split halves laterally into engagement with multiple, traveling pitter or deseeding mechanisms and then forwardly in synchronism with said mechanisms while they operate on the fruit halves simultaneously to pit or core the halves without interrupting the forward movement of the conveyor means. In a fruit treating machine, holders, cups or clamps have been provided to receive whole fruit, center and hold it in position during splitting along one plane, and then hold the split halves of the fruit with their exposed faces in planes transverse to the plane of splitting for simultaneous pitting or coring. A new, novel and improved splitting and spreading mechanism has been provided for dividing whole fruit and spreading the split halves while the fruit is continuously fed, without injury to or marring of the exposed surfaces of the fruit halves. Applicant has provided a pitting or coring mechanism for simultaneously removing the seed containing sections of two halves of a fruit while the fruit is continuously moved or fed along a predetermined path at a relatively high rate of speed; a device for simultaneously pitting two half peaches wherein the pitting is accomplished by mechanism carried by a pitting head which moves back and forth in synchronous speed relation to a continuously moving conveyor carrying the half peaches, the pitting mechanism on the head being automatically operated by the forward movement of the head which precludes operation of the pitting mechanism getting out of proper timed relation with the movement of the pitting head; a continuously operating machine for splitting whole peaches and pitting the halves, means for spreading the halves after splitting to present the split halves with cut faces exposed to a traveling pitter mechanism movable back and forth in proper timed relation to the continuous conveyor by which the fruit is fed, the back and forth movement serving to operate both the spreading mechanism and the pitting mechanism thereby simplifying the drive mechanism and assuring the maintenance of the proper timed relations between the several operated mechanisms; a traveling pitting mechanism capable of pitting two peach halves simultaneously as the halves are fed continuously without interruption or change in speed past a pitter zone; a continuous fruit feeder for a traveling pitter mechanism capable of simultaneously pitting two peach halves, which feeder moves the peach halves laterally of their path of feed into engagement with the traveling pitter head so that the necessity for raising and lowering the pitter head and mechanism carried thereby is avoided; a pitting device wherein a pitting head, which carries a pitting mechanism capable of simultaneously pitting two peach halves, is adapted to swing back and forth on pivotally mounted arms synchronized in the speed of their swinging movement with a continuous fruit feeder which embodies fruit holding mechanism movable toward and away from the swinging pitter head whereby to permit the pitting of both fruit halves simultaneously without stopping the feeding of the fruit; in a fruit treating machine, fruit holding cups so constructed and operated as to hold whole fruit for splitting and other treatment and also hold the fruit halves, after splitting, for subsequent treatments, thereby eliminating the need of multiple, separate conveyors and holders for whole and half fruit and transfer mechanism for carrying the fruit from one to the other; a fruit holder having four sections or quadrants relatively movable first to form an open top cup, with its mouth facing upwardly, for receiving a whole fruit, then to form horizontally spaced vertical clamps centralizing the fruit on a predetermined vertical plane and carrying it in such clamped position past a splitter device, and finally, to form half fruit holders supporting both fruit halves with their cut faces uppermost for presentation to a seeding or pitting mechanism which operates upon the halves from the exposed faces thereof simultaneously to seed or pit both halves; means in such a fruit holder for moving the cup sections or quadrants to or into their different positions or forms automatically as they move continuously along a predetermined endless path; and in a fruit treating machine a continuously operating fruit conveyor comprising endless chains and a plurality of fruit holders secured to said chains in spaced relation for continuous movement with the chains but so mounted and operated as to be relatively movable automatically toward and from each other to vertical, horizontal and other positions relative to the chains without interrupting the movement of the chains.

The present machine is not only adaptable to the handling of peaches deposited in the machine by hand, but also to machines wherein the fruit is fed by automatic feeding mechanisms into the fruit cups at the feed end of the machine. It will be also evident that certain features of the present invention are adaptable to machines wherein a half fruit is deposited in a continuously traveling half fruit holder.

Obviously the invention is not limited to the specific details of construction disclosed herein but is capable of numerous modifications and changes without departing from the spirit and scope of the appended claims.

Having thus described the invention, what I claim as new and desire to secure by Letters Patent is:

1. In a fruit treating machine, fruit feeding means comprising a continuously movable carriage, a first pair of fruit holding segments shiftably mounted on said carriage for movement toward and from each other, a second pair of fruit holding segments shiftably mounted on said carriage for relative movement toward and from each other, operating means for said first pair of cup segments including an actuatable member shiftably mounted on said carriage and operatively interconnected with said first pair of segments to move them toward and from each other, operating means for the second pair of segments including spring actuated means for moving the second pair of segments toward each other to form with the first pair of segments opposed whole fruit clamping means to clamp the fruit for splitting, means for operatively interconnecting the first and second pairs of segments to move the second pair of segments away from each other simultaneously with the movement of the first pair of segments away from each other, stationary actuating means in the path of the carriage for engaging said actuatable member to move the first pair of segments toward each other to form a whole fruit receiving receptacle, stationary means in the path of the carriage for preventing the movement of the second pair of segments toward each other for a predetermined time after the first pair of segments are moved to whole fruit receiving position and stationary means for thereafter engaging said actuatable member to move the segments of each pair simultaneously away from each other to form spaced holders for the fruit halves after splitting of the whole fruit.

2. In a fruit treating machine, fruit feeding means comprising a continuously movable carriage, a pair of inner cup segments and a pair of outer cup segments mounted on the carriage for swinging movement about a common axis to form a whole fruit holder when in closed position and half fruit holders when in open position, operating means carried by the carriage and operatively interconnected to the inner segments to swing them to closed position on movement of the operating means in one direction and to swing them to open position on movement of the operating means in the opposite direction, stationary control means in the path of movement of the carriage to engage and actuate said operating means first in said one direction and then in said opposite direction, operating means normally urging the outer segments to closed position, stationary control means in the path of movement of the carriage for holding the outer segments in spaced apart relation for a sufficient period to permit depositing of a whole fruit in the closed inner segments, and means operatively interconnecting inner and outer segments to cause opening of the outer segments simultaneously with the opening of the inner segments.

3. In a fruit treating machine, a continuous conveyor, fruit holders secured to said conveyor for movement therewith and relative thereto laterally of the conveyor to a closed position and in slightly spaced relation to receive and hold a whole fruit and away from each other to open-top position to support fruit halves, splitter means in the path of movement of the fruit held in the holders when in closed position to pass between the holders and split the fruit as the conveyor moves continuously, separating and spreading means past which the fruit is carried by said holders from the splitting means, said separating means including doubly divergent blades for moving the fruit halves to spread apart open-top position upon opening of the holders and with the cut faces of the fruit halves exposed, and a traveling pitter operable to engage the upwardly facing surfaces of the fruit halves to pit the same while the conveyor is moving continuously.

4. In a fruit treating machine, a continuous conveyor, fruit holders secured to said conveyor for movement therewith and relative thereto laterally of the conveyor to a closed position and in slightly spaced relation to receive and hold a whole fruit and away from each other to open position to support fruit halves, splitter means in the path of movement of the fruit held in the holders when in closed position to pass between the holders and split the fruit as the conveyor moves continuously, separating and spreading means past which the fruit is carried by said holders from the splitting means, said separating means including doubly divergent blades for moving the fruit halves to spread apart open position upon opening of the holders and with the cut faces of the fruit halves exposed, said spreading means including relatively shiftable wings movable away from each other to spread the fruit halves, a traveling pitter movable to and fro in timed relation with the conveyor and means operated by the traveling pitter for operating said spreader wings in timed relation thereto.

5. In a fruit treating machine, a continuous conveyor, fruit holders secured in spaced relation to the conveyor, each fruit holder comprising a pair of fruit holder sections relatively movable transversely of the direction of the movement of the conveyor between a closed position and an open position, fruit splitting means in the path of movement of whole fruit received in said sections when in closed position, separating and spreading means including relatively movable wings shiftable from an open position to a closed position to spread the fruit halves after splitting of the whole fruit, a traveling pitter movable parallel with the conveyor to engage and pit the fruit halves in the holders after spreading thereof, and means actuated by the traveling pitter for actuating the spreader means.

6. In a fruit treating machine, a continuous conveyor, fruit holders secured in spaced relation to the conveyor, each fruit holder comprising a pair of fruit holder sections relatively movable transversely of the direction of the movement of the conveyor between a closed position and an open position, fruit splitting means in the path of movement of whole fruit received in said sections when in closed position, separating and spreading means including relatively movable wings shiftable from an open position to a closed position to spread the fruit halves after splitting of the whole fruit, a traveling pitter movable parallel with the conveyor to engage and pit the fruit halves in the holders after spreading thereof, means actuated by the traveling pitter for actuating the spreader means, and power actuated means for shifting the fruit holders to open position in synchronism with the spreader wings.

7. In a fruit treating machine, means for feeding a pair of fruit halves with their cut surfaces exposed and facing upwardly at a continuous uniform rate along a predetermined path, a traveling pitter mounted for movement to and fro above the fruit halves and parallel to said path, means for moving said pitter forwardly in synchronism with said feeding means, said traveling pitter comprising a traveling support, a pair of fruit engaging plates secured to said support in spaced relation simultaneously to engage the exposed faces of the fruit halves in said feeding means, each of said plates having an opening therein, a pair of pitter blades mounted for movement to and fro with said support and relative thereto through the holes in the plates for movement about the seed containing sections in the upwardly facing surfaces of the fruit halves to pit the same, and means for simultaneously actuating said pitter blades.

8. In a fruit treating machine, means for feeding a pair of fruit halves with their cut faces exposed at a continuous uniform rate along a predetermined path, a traveling pitter movable to and fro parallel to said path, means for moving said pitter forwardly in synchronism with said feeding means, said traveling pitter comprising a traveling support, a pair of fruit engaging plates secured to said support in spaced relation simultaneously to engage the exposed faces of the fruit halves in said feeding means, each of said plates having an opening therein, a pair of pitter blades mounted for movement to and fro with said support and relative thereto through the holes in the plates for movement about the seed containing sections of the fruit halves to pit the same, means for simultaneouly actuating said pitter blades, said actuating means comprising spring returned actuating members operably connected to said pitter blades, and carried by said pitter support, operating members shiftably mounted on a fixed axis and positioned to engage said actuating members as the pitter support moves forwardly to move the said actuating members against the action of their springs, and means carried by the pitter support for releasing said operating members from said actuating members as the support approaches its forward limit of movement whereby said spring returned actuating members restore the pitter blades to position for a subsequent pitting operation.

9. In a fruit treating machine, a traveling pitter for pitting a fruit half while it is moving, said traveling pitter comprising a supporting frame, a plurality of parallel links supporting said frame for traveling movement, a pitter blade carried by said frame for movement therewith and relative thereto to pit a fruit half during the traveling movement of the pitter frame, actuating means for said pitter blade comprising an operating member mounted on said frame and operatively connected to said pitter blade, and a trigger member shiftably mounted for movement on a fixed axis and positioned in the path of movement of said operating member to engage and move the said operating member during traveling of the pitter frame, and means including a member carried by the pitter frame for releasing said trigger member from the said operating member at a predetermined point in the travel of said frame.

10. In a fruit pitting device comprising a conveyor movable at a substantially constant rate of advance over a path including a substantially horizontal portion, a succession of pairs of spaced fruit holders shiftably mounted on said conveyor and each holder adapted to hold a half fruit with its cut face uppermost, pitting mechanism including support means mounted for movement over said conveyor, said mechanism including pitter blades on said support means and movable downwardly relative to the support means, means for moving said pitting support means forwardly and backwardly above at least the substantially horizontal portion of the path of the conveyor, means for advancing said support means for a portion of its forward travel in the direction of advance of said conveyor and at the same rate of movement as said conveyor to maintain said blades on said support means superimposed over a pair of fruit holders mounted on said conveyor for a predetermined time interval, means for raising each pair of fruit holders during a portion of the forward travel of said pitting support means to position half fruits in said holders adjacent said support means, and means operating said pitter blades while the surface of said fruit halves are so adjacently positioned to pit the fruit halves.

11. A fruit pitting machine comprising a succession of pairs of half fruit carriers movable at a substantially constant rate over a path including a substantially horizontal portion, a pitting mechanism including support means mounted for movement over said substantially horizontal portion of the path of movement of said carriers, and pitter blades on said support means and movable downwardly relative thereto, means for moving said pitting support means back and forth above said substantially horizontal portion of the path of travel of said carriers, means for raising each pair of carriers during the time interval when the pitter support means is moving over said substantially horizontal portion to position the cut faces of the fruit halves in said carriers adjacent said pitter blades, and means for moving said pitter blades downwardly relative to said support means while the surfaces of said fruit halves are so adjacently positioned to pit the fruit halves.

12. In a machine of the character described, a continuously moving conveyor, a succession of spaced fruit holders on said conveyor, each holder being mounted on said conveyor for successive swinging upwardly away from then downwardly toward said conveyor during a predetermined portion of the path of travel of said conveyor, pitting mechanism, means for supporting said pitting mechanism at an angle of inclination over said conveyor, means for moving said supporting means with said pitting mechanism forwardly and backwardly over said conveyor, means for moving said pitting mechanism relative to its supporting means when a fruit holder positions a fruit adjacent to said supporting means, and means for automatically swinging said fruit holders in succession upwardly to position a fruit in the holder adjacent the pitting supporting means and downwardly from said supporting means on completion of the pitting operation.

13. In a machine of the character described, a continuously moving conveyor movable at a substantially constant rate, a succession of spaced apart pairs of fruit holders mounted on said conveyor, each pair of fruit holders being movable outwardly away from and then toward said conveyor during the travel of said conveyor, a pair of pitting mechanisms movable simultaneously to pit fruit halves carried in each pair of said fruit holders, common supporting means for said pitting mechanisms, means for moving said supporting means to and fro over a path overlying the path of travel of said conveyor and at substantially the same rate as the conveyor for at least a portion of said path of travel of the conveyor, said path of travel of said supporting means converging with the path of travel of each successive pair of fruit holders during a portion of the outward movement of each pair of fruit holders and as each pair travels with said conveyor at the same rate as said supporting means, and means for actuating said pitting mechanisms to pit fruit halves in a pair of holders during the converging portion of the paths of travel of said pair of fruit holders and said pitting supporting means.

14. A fruit pitting machine comprising a conveyor, means for advancing the conveyor at a predetermined constant rate, a fruit holder mounted on said conveyor for swinging movement about an axis fixed relative to the conveyor, a pitter support movable forwardly and backwardly along a path spaced from but extending longitudinally of the path of travel of said conveyor, pitting mechanism mounted on said pitting support, resilient means for swinging said fruit holder containing a half fruit with its cut face outermost toward said pitter support while the pitter support is moving in the direction of travel of the conveyor, said pitting mechanism including an apertured plate inclined at an angle substantially parallel to a radius through said axis to engage the cut face of a half fruit on swinging of the holder toward said support by said resilient means, and means carried by the pitter support for pitting the half fruit through the aperture in the plate when the cut face of the fruit is resiliently pressed into engagement with the plate and moving at the same speed as the pitter support.

15. In a fruit pitting machine, a conveyor, means for moving said conveyor at a continuous uniform rate, a pitter support movable forwardly and backwardly over at least a portion of the path of movement of the conveyor, a pair of half fruit holders mounted for swinging movement relative to the conveyor, a pair of inclined pitting members having openings therein, said members being mounted on said support to contact the cut faces of half fruits in said holders on swinging of the holders relative to the conveyor, said openings to expose the seed containing sections of the half fruits, pitter blades shiftably mounted on said support for movement through the openings in said members to pit the fruit halves, means for moving said support in synchronism with the conveyor while the cut faces of the fruit halves are in engagement with said members, and means for moving said pitter blades relative to said support while said support and said conveyor are synchronized.

16. In a fruit pitting machine, a conveyor movable continuously at a substantially uniform rate, a pitter support movable forwardly and backwardly over said conveyor, a pair of half fruit holders mounted on said conveyor for swinging movement about a common axis, a pair of pitter members mounted on said support and inclined at opposite angles, said members having openings therein to expose the pits in the fruit halves when the holders are swung upwardly to bring the cut faces of the half fruits in said holders into engagement with said members, pitter blades mounted on said conveyor for movement relative thereto through the openings in said members to pit the fruit halves in the holders when the cut faces of the half fruit contact said members, means for moving said support in synchronism with the conveyor while the cut faces of the half fruits engage said members, and means for moving said pitter blades relative to said support to pit the fruit halves during the synchronous movement of the support and the conveyor.

17. In a fruit pitting machine, a conveyor movable continuously at a substantially uniform rate, a pitter support movable forwardly and backwardly over said conveyor, a pair of half fruit holders mounted on said conveyor for swinging movement upwardly and downwardly about a common axis, a pair of pitter members mounted on said support and inclined at opposite angles, said members having openings therein to expose the pits in the fruit halves when the holders are swung upwardly to bring the cut faces of the half fruit in said holders into engagement with said members, pitter blades mounted on said conveyor for movement relative thereto through the openings in said members to pit the fruit halves in the holders when the cut faces of the half fruit contact said members, means for moving said support in synchronism with the conveyor while the cut faces of the half fruits engage said members, and means for operating said pitter blades including operating members carried by said support and actuating means in the path of movement of said operating members to engage and actuate said operating members during the synchronous movement of the support and the conveyor.

18. In a fruit treating machine, fruit holding means comprising a pair of segments pivoted on a substantially common axis to form a first, open-top receptacle for receiving whole fruit, other segments mounted for relative swinging movement substantially about said axis to encompass and clamp whole fruit received in the first receptacle, means for splitting the whole fruit when so clamped, and means for swinging said segments relatively about said substantially common axis to form two separate open-top receptacles for holding half fruits after splitting.

19. In a fruit treating machine, fruit holder means comprising a first pair of relatively movable segments mounted for swinging movement toward each other to form an open-top receptacle for receiving whole fruit, a second pair of segments mounted for swinging movement relative to each other and to the first pair of segments, means for swinging the second pair of segments relatively toward each other and the first pair of segments to form a whole fruit enclosing receptacle, control means for said first pair of segments for holding said segments against relative movement away from each other to receive the fruit and thereafter releasing said segments for relative swinging movement away from each other as the second pair of segments move toward each other whereby to permit the whole fruit automatically to be centralized with respect to a predetermined plane.

20. In a fruit treating machine, a conveyor, fruit holder means comprising cup quadrants each mounted on the conveyor for swinging movement about a substantially common axis relative to the others, means for swinging a pair of said quadrants about said axis toward each other during movement of the conveyor to form an open-top receptacle for whole fruit, means for swinging the other pair of quadrants about said axis relatively toward each other and over the first pair of quadrants during movement of the conveyor to form opposed fruit clamping sections clamping the whole fruit received in the first pair of quadrants and adapted to hold the whole fruit for splitting, and quadrant actuating means for simultaneously swinging the quadrants of opposed clamping sections about said axis relatively away from each other during movement of the conveyor to form open-top receptacles to hold the half fruit after splitting.

21. In a fruit treating machine, a conveyor, fruit holder means comprising cup quadrants mounted on said conveyor for swinging movement about a common axis, cup quadrant actuating mechanism including means operable in timed relation to said conveyor to swing a first pair of cup quadrants relatively to form an open-top receptacle for receiving and supporting whole fruit and then the other pair of cup quadrants relatively to form opposed clamping sections to clamp therein the whole fruit received in said receptacle, said clamping sections being adapted to hold the whole fruit for splitting, and means operable in timed relation to said conveyor simultaneously to swing the quadrants forming opposed clamping sections away from each other to support the fruit halves after splitting of the whole fruit.

HENRY A. SKOG.

References Cited in the file of this patent

UNITED STATES PATENTS

| Number | Name | Date |
|---|---|---|
| 426,281 | King | Apr. 22, 1890 |
| 1,261,704 | Clemson | Apr. 2, 1918 |
| 1,292,261 | Clifford | Jan. 21, 1919 |
| 1,387,183 | Robbins | Aug. 9, 1921 |
| 1,480,819 | Forrester | Jan. 15, 1924 |
| 1,512,410 | Eldridge | Oct. 21, 1924 |
| 1,617,909 | Jepson | Feb. 15, 1927 |
| 1,785,011 | Felizianetti | Dec. 16, 1930 |
| 1,901,042 | Robbins | Mar. 14, 1933 |
| 1,915,447 | Robbins | June 27, 1933 |
| 1,932,779 | Ayars | Dec. 4, 1934 |
| 2,216,165 | Ewald et al. | Oct. 1, 1940 |
| 2,259,332 | Winkelman | Oct. 14, 1941 |
| 2,329,212 | Nawman | Sept. 14, 1943 |
| 2,380,530 | Jepson | July 31, 1945 |
| 2,428,157 | Healy | Sept. 30, 1947 |
| 2,443,863 | Lindley, Jr. | June 22, 1948 |

FOREIGN PATENTS

| Number | Country | Date |
|---|---|---|
| 7,877/27 | Australia | June 21, 1927 |
| 6,169/32 | Australia | Feb. 17, 1932 |